US012770852B2

(12) United States Patent
Stewart

(10) Patent No.: US 12,770,852 B2
(45) Date of Patent: Oct. 20, 2026

(54) ION GUIDE

(71) Applicant: Thermo Fisher Scientific (Bremen) GmbH, Bremen (DE)

(72) Inventor: Hamish Stewart, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 432 days.

(21) Appl. No.: 18/467,553

(22) Filed: Sep. 14, 2023

(65) Prior Publication Data

US 2024/0096613 A1 Mar. 21, 2024

(30) Foreign Application Priority Data

Sep. 15, 2022 (GB) ...................................... 2213536

(51) Int. Cl.
*H01J 49/06* (2006.01)
*H01J 49/16* (2006.01)

(52) U.S. Cl.
CPC .......... *H01J 49/065* (2013.01); *H01J 49/164* (2013.01)

(58) Field of Classification Search
CPC .............................. H01J 49/065; H01J 49/164
See application file for complete search history.

(56) References Cited

U.S. PATENT DOCUMENTS

| | | | | |
|---|---|---|---|---|
| 6,107,628 A | 8/2000 | Smith et al. | | |
| 7,514,673 B2 | 4/2009 | Senko et al. | | |
| 8,581,181 B2 | 11/2013 | Giles | | |
| 9,620,347 B2 | 4/2017 | Zhang | | |
| 2003/0178563 A1* | 9/2003 | Makarov | H01J 49/164 250/423 P | |
| 2015/0235832 A1 | 8/2015 | Giles | | |
| 2019/0371583 A1 | 12/2019 | Shion et al. | | |
| 2020/0015717 A1* | 1/2020 | Taghioskoui | H01J 49/107 | |
| 2021/0233759 A1* | 7/2021 | Kim | H01J 49/062 | |

FOREIGN PATENT DOCUMENTS

| | | | | |
|---|---|---|---|---|
| GB | 2574328 A | 12/2019 | | |
| WO | WO-2019008391 A1 * | 1/2019 | H01J 49/063 | |

OTHER PUBLICATIONS

Combined Search and Examination Report under Sections 17 & 18(3) for related GB Application No. 2213536.2, dated Mar. 23, 2023, 5 pages.

* cited by examiner

*Primary Examiner* — Georgia Y Epps
*Assistant Examiner* — Hanway Chang
(74) *Attorney, Agent, or Firm* — Klarquist Sparkman, LLP

(57) ABSTRACT

An ion guide is provided for a spectrometer. The ion guide comprises a first electrode assembly, comprising a plurality of guide electrodes aligned along a central axis. Each guide electrode comprises an aperture. The apertures define an ion channel from a first end of the first electrode assembly to a second end of the first electrode assembly. The ion channel is configured to receive an ion beam at the first end. The guide electrodes are configured to receive RF voltages to define a confinement volume for the ion beam, wherein the confinement volume is centred about the central axis. The ion guide comprises a second electrode assembly adjacent to the first electrode assembly, wherein the second electrode assembly is configured to receive a DC voltage, such that a centre of the ion beam is deflected to be off the central axis.

25 Claims, 24 Drawing Sheets

ION GUIDE

CROSS REFERENCE TO RELATED APPLICATION

This application claims priority from application GB2213536.2, filed Sep. 15, 2022. The entire disclosure of application GB2213536.2 is incorporated herein by reference.

FIELD OF THE DISCLOSURE

The disclosure relates to the field of ion spectrometers and/or ion guides.

BACKGROUND

Analysers of ion spectrometers, such as mass or optical spectrometers, and other ion-utilising instruments typically require high or ultra-high vacuums. However, the ion sources used are often at higher pressures. Ions are typically guided to apertures for transfer between vacuum regions. In order to provide good transmission through the aperture, it can be beneficial to spatially focus the ion beam.

A common way to guide ions to a high vacuum region is by using an ion funnel (for example, as shown in U.S. Pat. No. 6,107,628A). An ion funnel typically has a series of stacked radio frequency (RF) ring electrodes, which generate a repulsive RF pseudopotential inside the funnel. The inner radius of the funnel gradually reduces, focusing the ion beam until it reaches the aperture at the end of the funnel.

The ion beam often enters the spectrometer as part of a gas jet, that also includes droplets and neutrals. In conventional ion funnels, there is a risk of the neutrals and droplets striking the RF electrodes, causing contamination and charging effects. Additionally, it may be beneficial to extract the ion beam from the gas jet so that only the ions pass through the aperture.

Several existing devices aim to focus the ion beam while avoiding neutral contamination, by creating the focusing effect of an ion funnel, without narrowing the radius of the RF electrode rings.

One of these employs a narrowing RF pseudopotential, similar to that achieved by an ion funnel, but the RF pseudopotential is generated by stacked RF electrodes with constant radius and increasing separation (for example, as described in U.S. Pat. No. 7,514,673B2). The increasing separation increases the penetration of RF into the channel of the electrodes, focusing the ion beam. An issue with large inter-electrode spacing and with field penetration into the central channel is that they can cause ion fragmentation due to forcing the ions through RF barriers. One mitigation is to increase the density of the electrode rings.

Another example of an ion guide is the StepWave ion guide (described in U.S. Pat. No. 8,581,181B2), which uses two conjoined ion guides with a DC step between them to move ions from one to the other. A strong DC step can cause ion fragmentation.

Ion fragmentation can also occur if the radius of an ion funnel decreases such that there is no channel free of an RF field. The reduction of the radius can be limited to mitigate this.

Another device (U.S. Pat. No. 9,620,347B) is also based on stacked rings with constant radius, but applies a focusing DC gradient by splitting the rings and applying different DC voltages to them. This requires a complex electrode structure.

SUMMARY OF THE DISCLOSURE

Against this background, there is provided: an ion guide for a spectrometer. The ion guide comprises a first electrode assembly comprising a plurality of guide electrodes aligned along a central axis, wherein each guide electrode comprises an aperture; the central axis passes through the apertures such that the apertures define an ion channel from a first end of the first electrode assembly to a second end of the first electrode assembly; the ion channel is configured to receive an ion beam at the first end; and the guide electrodes are configured to receive RF voltages to define a confinement volume for the ion beam, wherein the confinement volume is centred about the central axis. The ion guide further comprises a second electrode assembly adjacent to the first electrode assembly, wherein the second electrode assembly is positioned with respect to the first electrode assembly and is configured to receive a DC voltage, such that a centre of the ion beam is deflected to be off the central axis.

In this way the ion beam may be deflected to be off the central axis and may be radially focused. The ion beam may be directed towards an ion exit aperture by the deflection, and the acceptance of the ion beam at the ion exit aperture may be improved by the radial focusing. In addition, in an event that the ion beam enters the ion guide as part of a jet comprising neutrals or droplets, the neutrals will be undeflected and will continue along their original trajectory. Deflecting the ion beam allows the ions to be separated from the neutrals, so that mainly or only ions pass through the ion exit aperture.

Each guide electrode may comprise an annular electrode.

In this way, the guide electrodes comprise an aperture (as a result of the annular shape), and an outer surface of a similar shape to the aperture. The distance of the second electrode assembly from an outer surface of the guide electrodes may be proportional to the distance of the second electrode assembly from an inner surface of the guide electrodes. The second electrode assembly may be shaped to have an inner surface of a similar shape to the outer surface of the guide electrodes and to the aperture, allowing a close fit between the second electrode assembly and the first electrode assembly and therefore better penetration of the DC field into the ion channel.

The aperture of each guide electrode may comprise a circle.

This may result in a cylindrical confinement volume.

The aperture of each guide electrode may comprise an oval.

In this way, the confinement volume may have an oval cross-section so the radial focusing of the deflected ion beam may be improved, in an event that the ion beam is deflected towards a narrower part of the oval.

The aperture of each guide electrode may comprise at least one vertex.

In this way, the radial focusing of the deflected ion beam may be improved, in an event that the ion beam is deflected towards the vertex.

The aperture of each guide electrode may comprise a combination of a first shape and a second shape, wherein the first shape overlaps with the second shape.

In this way, the ion beam may be deflected to be within either the first shape or the second shape, which may improve radial focusing. Also, the deflected ion beam may be shielded from the DC field once within either the first or second shape, so a strong deflecting DC field may be used while avoiding pushing the ion beam too close to the RF guide electrodes, reducing the risk of ion loss or fragmentation.

The first electrode may comprise the plurality of guide electrodes at constant spacing.

Advantageously, constant spacing of the guide electrodes may reduce the risk of ion fragmentation since the ions are not forced through significant RF barriers.

The first electrode may comprise the plurality of guide electrodes with increasing spacing along the central axis.

In this way, the penetration of the DC field is increased along the central axis, which may (for an attractive DC field) generate an axial DC gradient that assists in moving the ions along the ion channel.

The first electrode may comprise the plurality of guide electrodes with decreasing spacing along the central axis.

In this way, the penetration of the DC field is decreased along the central axis, which may (for a repulsive DC field) generate an axial DC gradient that assists in moving the ions along the ion channel.

The plurality of guide electrodes may be configured to receive RF voltages of alternating polarity.

In this way, a repulsive RF field or pseudopotential is generated, and a confinement volume is defined.

The second electrode assembly may be configured to receive a repulsive DC voltage.

In this way, the ions may be deflected away from the second electrode assembly.

The second electrode assembly may be configured to receive an attractive DC voltage.

In this way, the ions may be deflected towards the second electrode assembly.

The second electrode assembly may comprise a curved sheet electrode.

Advantageously, this may improve radial focusing of the ion beam.

The second electrode assembly may comprise a partial cylindrical shell electrode.

Advantageously, this may improve radial focusing of the ion beam, particularly for a repulsive DC field. A partial cylindrical shell electrode may be used in conjunction with a first electrode assembly comprising circular ring electrodes.

The second electrode assembly may comprise a plurality of partial cylindrical shell electrodes.

Advantageously, using segmented electrodes for the second electrode assembly allows an axial DC gradient to be generated by applying different DC voltages to each segment.

The second electrode assembly may comprise a rod electrode.

This may improve radial focusing of the ion beam, particularly for an attractive DC field.

The second electrode assembly may comprise a flat sheet electrode.

This may complement certain shapes of guide electrode. For example, a flat electrode adjacent to a side of a first electrode assembly with a triangular cross-section may be used to deflect ions towards the vertex of the triangle, improving radial focusing of the ion beam.

The second electrode assembly may comprise a plurality of electrodes.

Advantageously, using segmented electrodes for the second electrode assembly allows an axial DC gradient to be generated by applying different DC voltages to each segment.

A distance from the central axis to the second electrode assembly may vary along the central axis.

In this way, an axial DC gradient may be generated, which may be used to assist moving ions along the ion channel.

The second electrode assembly may be positioned externally to the first electrode assembly.

In this way, the spacing between the guide electrodes may be kept low, reducing RF field penetration into the channel and so reducing the risk of ion fragmentation.

The second electrode assembly may comprise a plurality of auxiliary electrodes mounted between the plurality of guide electrodes.

In this way, the penetration of the DC field into the ion channel may be increased.

The ion guide may be configured to receive the ion beam offset from the central axis.

Any neutrals entering the ion channel with the ion beam may continue on their original trajectory, so deflecting the ion beam to be off the central axis separates the ion beam and the neutrals. If the ion channel receives the ion beam offset from the central axis, this may increase the separation of the deflected ion beam from the neutrals and may increase the probability that only ions pass through the ion exit aperture for use in the instrument.

An inlet apparatus for a spectrometer may comprise an ion guide as herein described.

In this way, the ion guide may be used to direct a radially focused ion beam to an analytical instrument, having been separated from any neutrals or droplets in the jet.

The inlet apparatus may further comprise an ion exit aperture configured to receive the deflected ion beam exiting the ion channel and to direct the ion beam towards an analyser of the spectrometer.

In this way the ion beam may be directed towards a region of lower pressure and/or an analytical instrument.

The inlet apparatus may further comprise a jet exit aperture configured to receive undeflected neutral components of the ion beam exiting the ion channel.

In this way the jet of neutral components may be separated from the ion beam, and may be directed away from the analytical instrument.

The inlet apparatus may further comprise a first inlet capillary, wherein the ion channel is configured to receive the ion beam via the first inlet capillary.

In this way the ions from the ion source may be directed into the ion channel. The ion guide may be contained within a vacuum chamber, and the inlet capillary may be configured to receive ions from an ion source outside of the vacuum chamber and provide the ions to the ion guide within the vacuum chamber.

The inlet apparatus may further comprise a second inlet capillary, wherein the ion channel is configured to receive a first ion beam via the first inlet capillary and to receive a second ion beam via the second inlet capillary.

In this way the ion guide may be configured to receive ion beams from more than one ion source, such as a sample ion source and a calibrant ion source. Both ion beams may be received by the ion channel at the first end, separately or at the same time. The confinement volume may be defined for both ion beams, and the centre of both ion beams may be deflected to be off the centre axis. The first and second ion beams may be deflected to exit from the same ion exit aperture.

The inlet apparatus may further comprise an ion source comprising a sample plate configured to release ions upon irradiation.

The sample plate may be positioned adjacent to the first end of the first electrode assembly, so may release ions directly into the ion channel.

The inlet apparatus may be configured to receive a laser beam through the ion channel.

In this way the sample plate may be irradiated to produce ions in situ. In an event that the radii of the apertures of the guide electrodes is constant along the ion guide (as opposed to decreasing radii of an ion funnel), the laser beam may enter the ion guide via the second end at a narrow or zero angle.

The sample plate may comprise a matrix-assisted laser desorption/ionization, MALDI, plate.

In this way the sample plate may comprise a sample and matrix mixture, which upon irradiation by a laser undergoes ablation and desorption. The sample molecules (analyte molecules) may then be ionized in a hot plume of ablated gases, wherein the gases transport the ions into the ion channel.

BRIEF DESCRIPTION OF THE DRAWINGS

A specific embodiment of the disclosure will now be described, by way of example only, with reference to the accompanying drawings in which:

FIG. 3A shows a side view and FIG. 3B shows a cross-section perpendicular to the central axis.

FIG. 5A shows a side view and FIG. 5B shows a cross-section perpendicular to the central axis.

In FIG. 11A, the first electrode assembly comprises stacked oval electrodes and the second electrode assembly comprises a curved electrode or electrodes. In FIG. 11B, wherein the first electrode assembly comprises stacked electrodes with triangular apertures and the second electrode assembly comprises a flat sheet electrode or electrodes.

FIG. 13A shows the electrodes mounted on a substrate, and FIG. 13B shows the electrodes mounted with spacers between them.

FIG. 14A shows a perspective view of the ion guide, FIG. 14B shows a cross-section of the ion guide perpendicular to the central axis, and FIG. 14C shows a side view of the ion guide.

DETAILED DESCRIPTION

Figure 1:
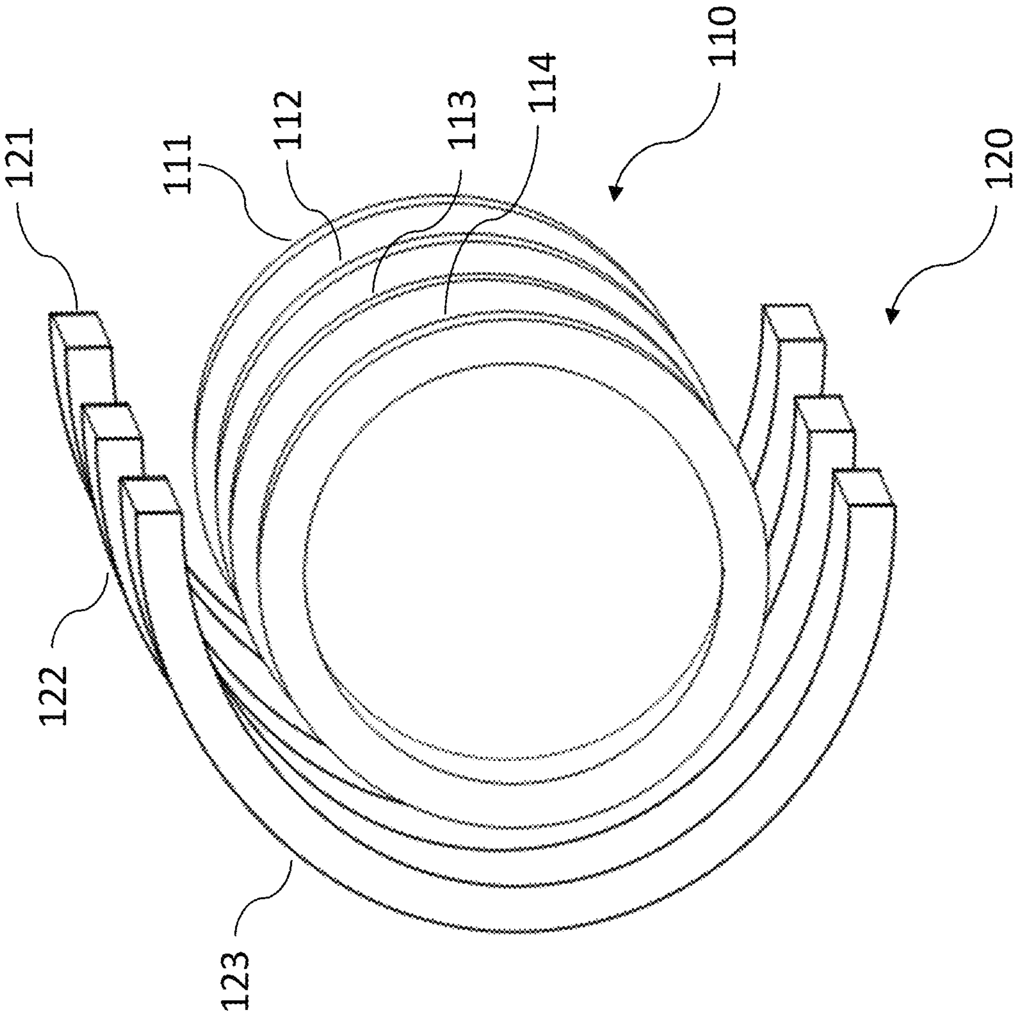
FIG. 1 shows a schematic drawing of a perspective view of an ion guide in accordance with an embodiment of the present disclosure, wherein the first electrode assembly comprises stacked ring electrodes and the second electrode assembly comprises curved electrodes.

An ion guide is provided for a spectrometer according to an embodiment of the present disclosure. The ion guide comprises a first electrode assembly comprising a plurality of guide electrodes aligned along a central axis. Each guide electrode comprises an aperture. The central axis passes through the apertures such that the apertures define an ion channel from a first end of the first electrode assembly to a second end of the first electrode assembly. The ion channel is configured to receive an ion beam at the first end.

The guide electrodes are configured to receive radio frequency (RF) voltages to define a confinement volume for the ion beam, wherein the confinement volume is centred about the central axis. The ion guide further comprises a second electrode assembly adjacent to the first electrode assembly. The second electrode assembly is positioned with respect to the first electrode assembly and is configured to receive a DC voltage, such that a centre of the ion beam is deflected to be off the central axis.

The plurality of guide electrodes may be configured to receive RF voltages such that the guide electrodes apply an RF pseudopotential within the ion channel. The RF pseudopotential may define the confinement volume. The polarity of the RF voltages may alternate between adjacent guide electrodes.

Each aperture of the plurality of guide electrodes may be the same shape and size in a plane perpendicular to the central axis. A cross-section of the confinement volume perpendicular to the central axis may comprise a constant shape and size along the ion channel.

The second electrode assembly is configured to receive a DC voltage such that the centre of the ion beam is deflected to be off the central axis. In embodiments, the deflected ion beam may be contained within the confinement volume.

The ion guide may be configured to receive an ion beam centred on the central axis, or an ion beam offset from the central axis.

The DC field generated by the second electrode assembly may penetrate the ion channel through the inter-electrode gaps between guide electrodes.

In embodiments, the spacing between the plurality of guide electrodes may be constant.

In embodiments, the plurality of guide electrodes of the first electrode assembly may comprise stacked annular electrodes, such as stacked ring electrodes. The aperture of each stacked ring electrode may have the same radius. The spacing of the stacked ring electrodes (in a direction parallel to the central axis) may be constant or may vary. The second electrode assembly may comprise a curved electrode positioned such that an inner surface of the curved electrode is at a larger radial distance from the central axis than an inner surface of the guide electrodes. The curved electrode may comprise a section of an annulus, or a section of a hollow cylinder. The curved electrode may partially enclose the guide electrodes. For example, the inner surface of the curved ring electrode may be at a larger radial distance from the central axis than an outer surface of the guide electrodes. The centre of curvature of the curved electrode may correspond to the central axis of the first electrode assembly. The radius of the curved electrode may be constant or may vary along the central axis. The second electrode assembly may comprise a plurality of curved electrodes. The plurality of curved electrodes may each have the same radius of curvature and may subtend the same angle to the centre of curvature. The radius of the plurality of curved electrodes may vary. The angle subtended by the curved electrodes to the centre of curvature may vary. The spacing between the plurality of curved electrodes (in a direction parallel to the central axis) may be constant or may vary.

Figure 2:
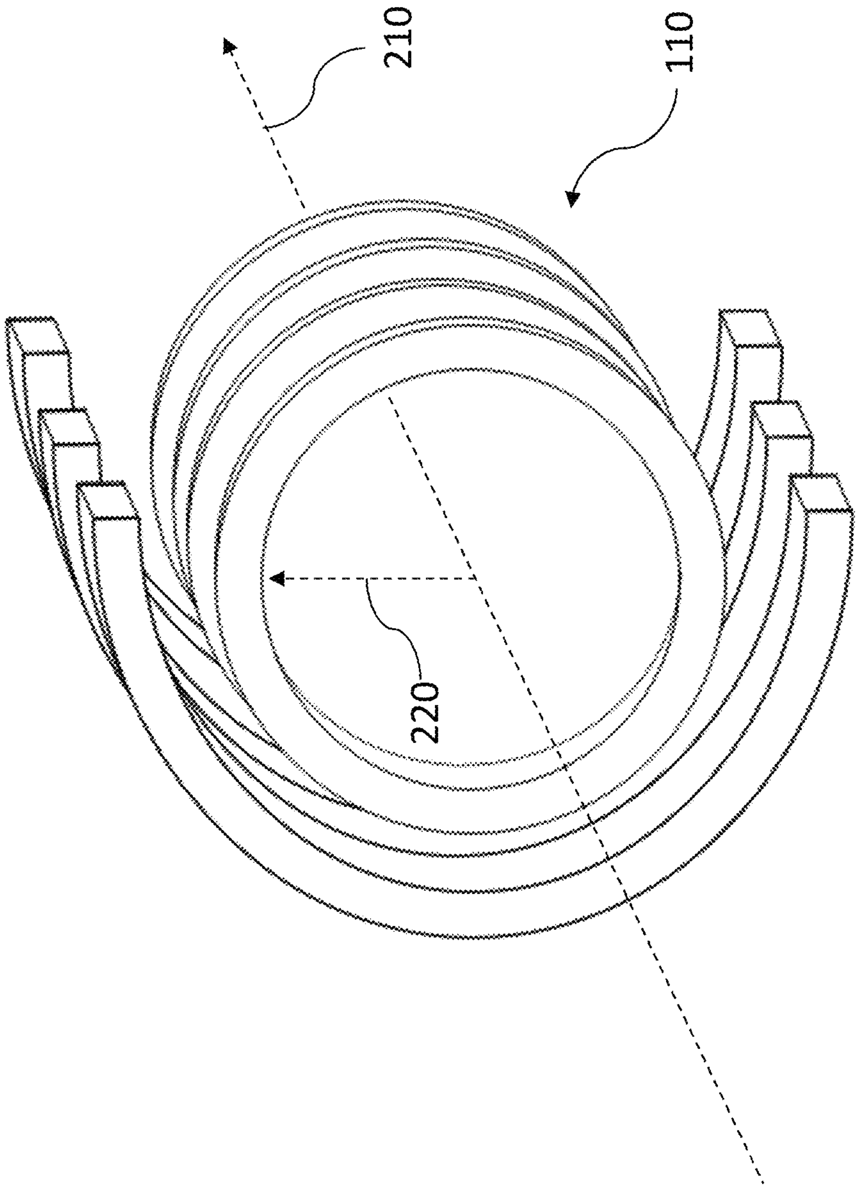
FIG. 2 shows a schematic drawing of a perspective view of the ion guide of FIG. 1, with axes indicated.

With reference to FIGS. 1 and 2, an ion guide according to an embodiment of the present disclosure is shown. The plurality of guide electrodes may comprise stacked ring electrodes 110. FIG. 1 shows four stacked ring electrodes 111, 112, 113 and 114 as an example, but there may be any other number (greater than one) of stacked ring electrodes. FIGS. 1 and 2 may show a section of an ion guide, such that the ion guide may comprise more electrodes than shown in FIGS. 1 and 2. For example, the electrodes shown in FIGS. 1 and 2 may repeat. FIG. 2 shows the central axis as a dashed arrow, labelled 210. A radial axis perpendicular to the central axis is shown as dashed arrow 220. The embodiment illustrated in FIGS. 1 and 2 shows stacked ring electrodes 110 each comprising an aperture with a circular cross-section perpendicular to the central axis. Each aperture may have the same radius and/or each aperture may comprise a constant radius through the thickness of the guide electrode (that is, parallel to the central axis).

The second electrode assembly may comprise a curved electrode, wherein the curved electrode comprises an inner radius that is larger than an outer radius of the first electrode assembly. The curved electrode may comprise a partial annulus or an arc of a cylinder, wherein the centre of curvature aligns with the central axis of the first electrode assembly 110. In this way, the secondary electrode assembly may partially enclose the first electrode assembly. The second electrode assembly 120 may comprise one or more curved electrodes. FIGS. 1 and 2 illustrate an exemplary embodiment in which the second electrode assembly 120 comprises three curved electrodes 121, 122 and 123. The curved electrodes may be aligned along the central axis such that they are positioned in the gaps between the guide electrodes. In the example shown in FIGS. 1 and 2, the curved electrodes each comprise a half annulus (that is, their outer shapes are semi-circular) and subtend an angle of 180° at the centre of curvature. In other examples, the curved electrodes may subtend any angle below approximately 270° at the centre of curvature.

FIGS. 1 and 2 show the second electrode assembly comprising a plurality of curved electrodes. The second electrode assembly may comprise a single electrode or may comprise a plurality of electrodes. In either case, the second electrode assembly may be used to apply a DC field that is constant along the central axis, or may be used to apply a DC field that varies along the central axis. The DC field may vary radially or in a direction perpendicular to the central axis, such that the ion beam is deflected to be off the central axis.

By way of example, several configurations of the second electrode assembly are shown in FIGS. 3 to 6. Each of FIGS. 3 to 6 shows first electrode assembly 310 comprising stacked electrodes with constant spacing and constant radius. The stacked electrodes are shown as white rectangles, with three examples labelled as 311, 312 and 313. There may be any number of stacked electrodes, with any radius, thickness and spacing. An ion exit aperture 320 is also shown, and the central axis is indicated by dashed arrow 330. The second electrode assemblies are shown with hatching.

Figure 3A:
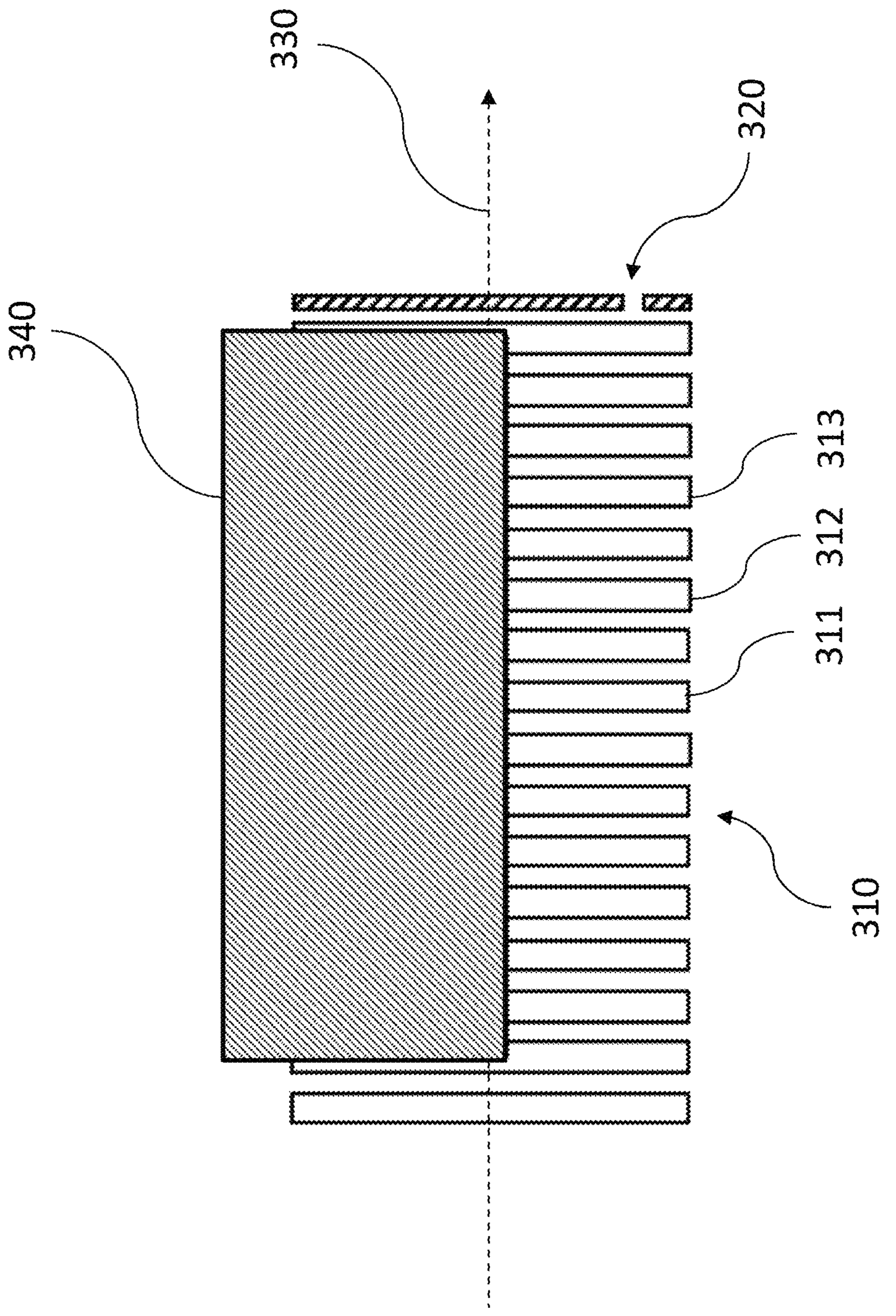
FIGS. 3A-3B show schematic drawings of an ion guide in accordance with an embodiment of the present disclosure, wherein the first electrode assembly comprises stacked ring electrodes and the second electrode assembly comprises a curved electrode.
Figure 3B:
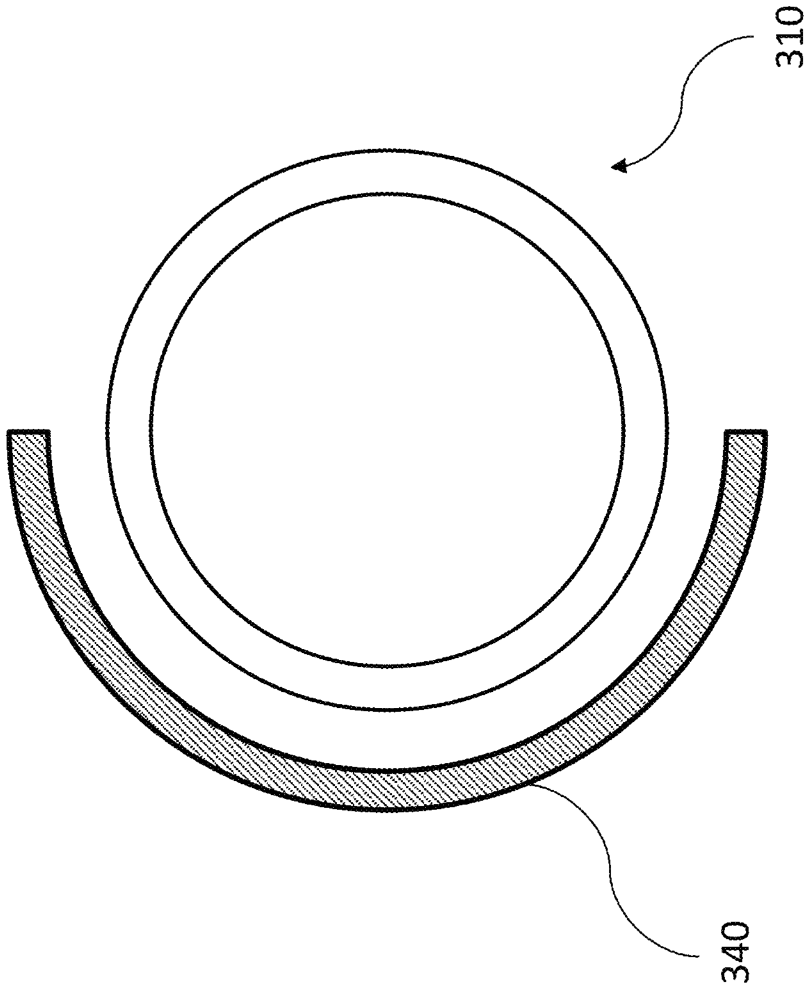

With reference to FIG. 3, a second electrode assembly may comprise a single electrode 340. The single electrode may be positioned at a distance from the central axis that is greater than an outer radius of the first electrode assembly. The single electrode of the second electrode assembly may comprise a shell configured to partially enclose the first electrode assembly. For example, the second electrode assembly may comprise a partial hollow cylinder (that is, an arc of a cylindrical shell) positioned such that an inner concave surface of the second electrode assembly is adjacent to an outer convex surface of the first electrode assembly. There may be a gap between the concave surface of the second electrode assembly and the convex surface of the first electrode assembly. FIG. 3A shows a side view. FIG. 3B shows a cross-section in a plane perpendicular to the central axis for an embodiment where the second electrode assembly comprises a partial cylindrical shell with an arc of 180°.

Figure 4:
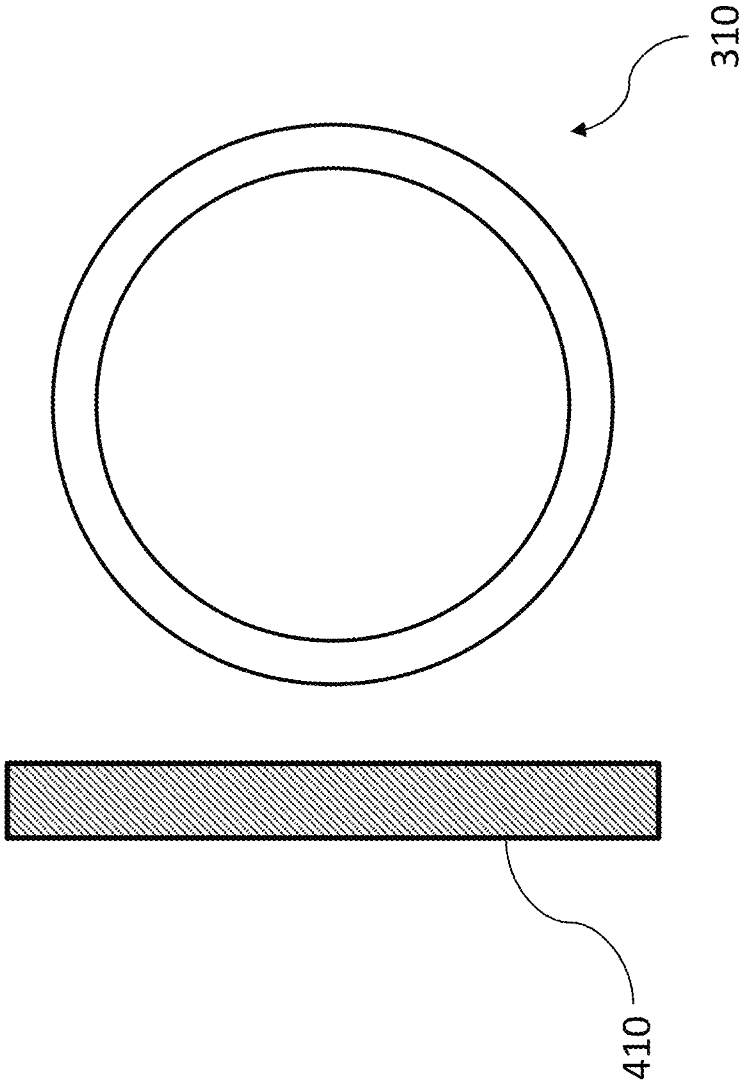
FIG. 4 shows a schematic drawing of a cross-section perpendicular to the central axis of an ion guide in accordance with an embodiment of the present disclosure, wherein the first electrode assembly comprises stacked ring electrodes and the second electrode assembly comprises a flat sheet electrode.

With reference to FIG. 4, the second electrode assembly may comprise a single electrode comprising a flat sheet electrode 410. FIG. 4 shows a cross-section in a plane perpendicular to the central axis.

Figure 5A:
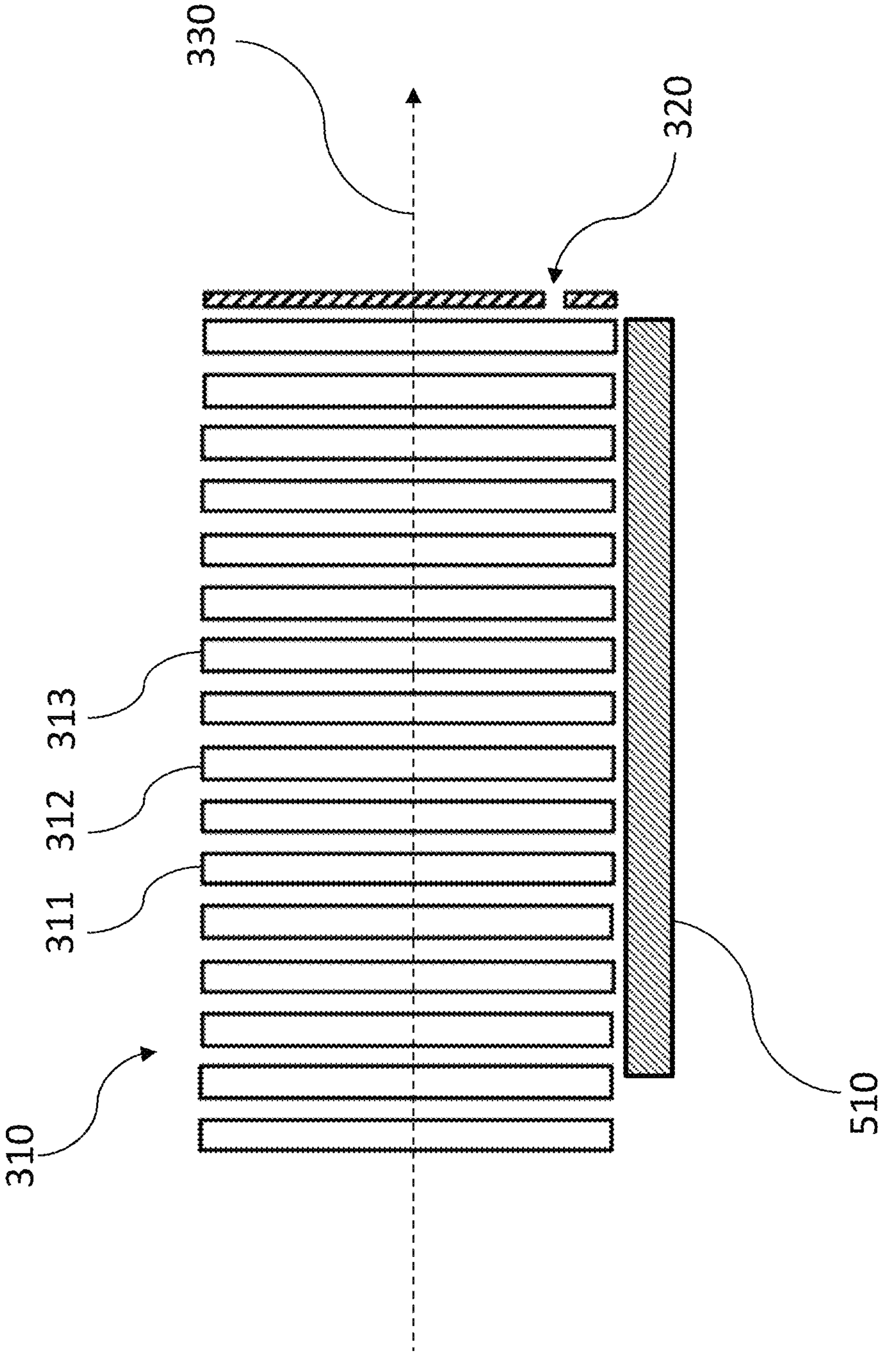
FIGS. 5A-5B show schematic drawings of an ion guide in accordance with an embodiment of the present disclosure, wherein the first electrode assembly comprises stacked ring electrodes and the second electrode assembly comprises a rod electrode.
Figure 5B:
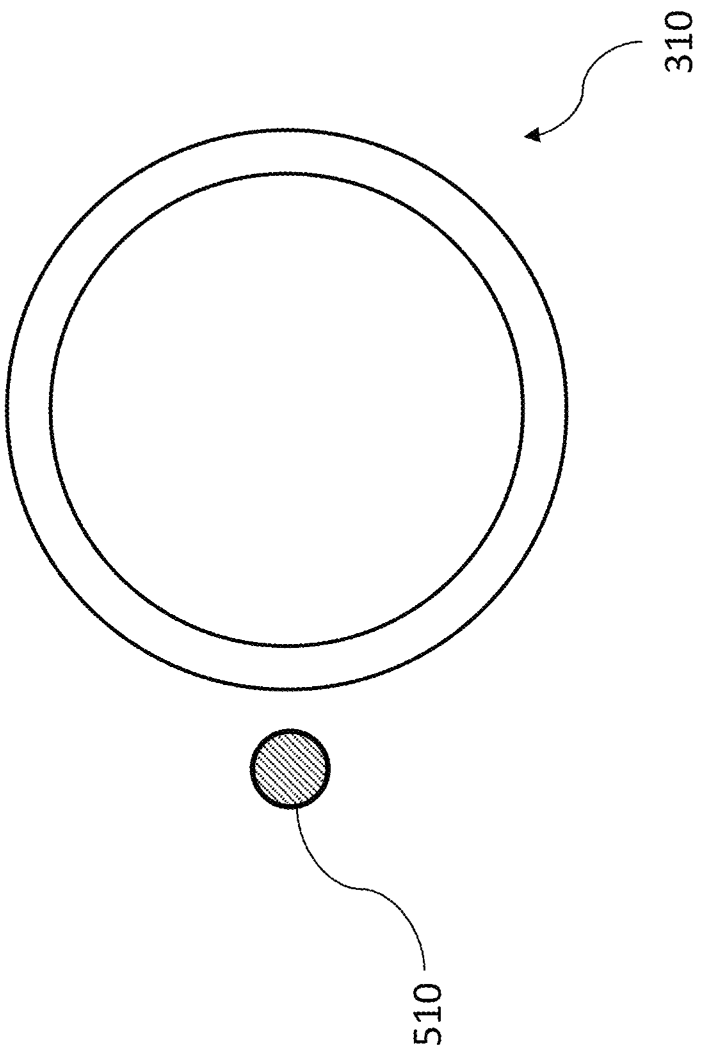

With reference to FIG. 5, the second electrode assembly may otherwise comprise a single electrode comprising a rod electrode 510 positioned adjacent to the outer convex surface of the first electrode assembly. FIG. 5A shows a side view and FIG. 5B shows a cross-section in a plane perpendicular to the central axis. In other embodiments, the second electrode may comprise an electrode or electrodes of any shape.

As shown in FIGS. 3 to 5, the second electrode assembly comprising a single electrode may be parallel to the central axis of the first electrode assembly. For example, the centre of curvature of a partial hollow cylinder may be on the central axis or may be a constant distance from the central axis. A sheet or rod electrode may be parallel to the central axis. In use, a second electrode assembly comprising a single electrode parallel to the central axis may be used to apply a DC field that is constant along a direction parallel to the central axis. Where the DC field is constant along the direction parallel to the central axis, ions may be urged along the ion guide in a direction parallel to the central axis due to gas dynamics and/or space charge effects.

In other embodiments, an axial DC gradient may be used to urge ions along the ion guide in a direction parallel to the central axis. For example, the single electrode may be coated in a resistive material. In use, a first DC voltage may be applied to a first end of the single electrode, and a second DC voltage may be applied to a second end of the single electrode, such that an axial DC gradient is generated (in a direction parallel to the central axis). In other embodiments, the second electrode assembly may comprise a partial cylindrical sheet wherein the radius of curvature of the cylindrical sheet is constant but the angle subtended by the partial cylindrical sheet at the centre of curvature varies. In this way the arc of the partial cylindrical sheet varies along the length of the central axis. In use, an axial DC gradient may be generated along a direction parallel to the central axis.

Figure 6:
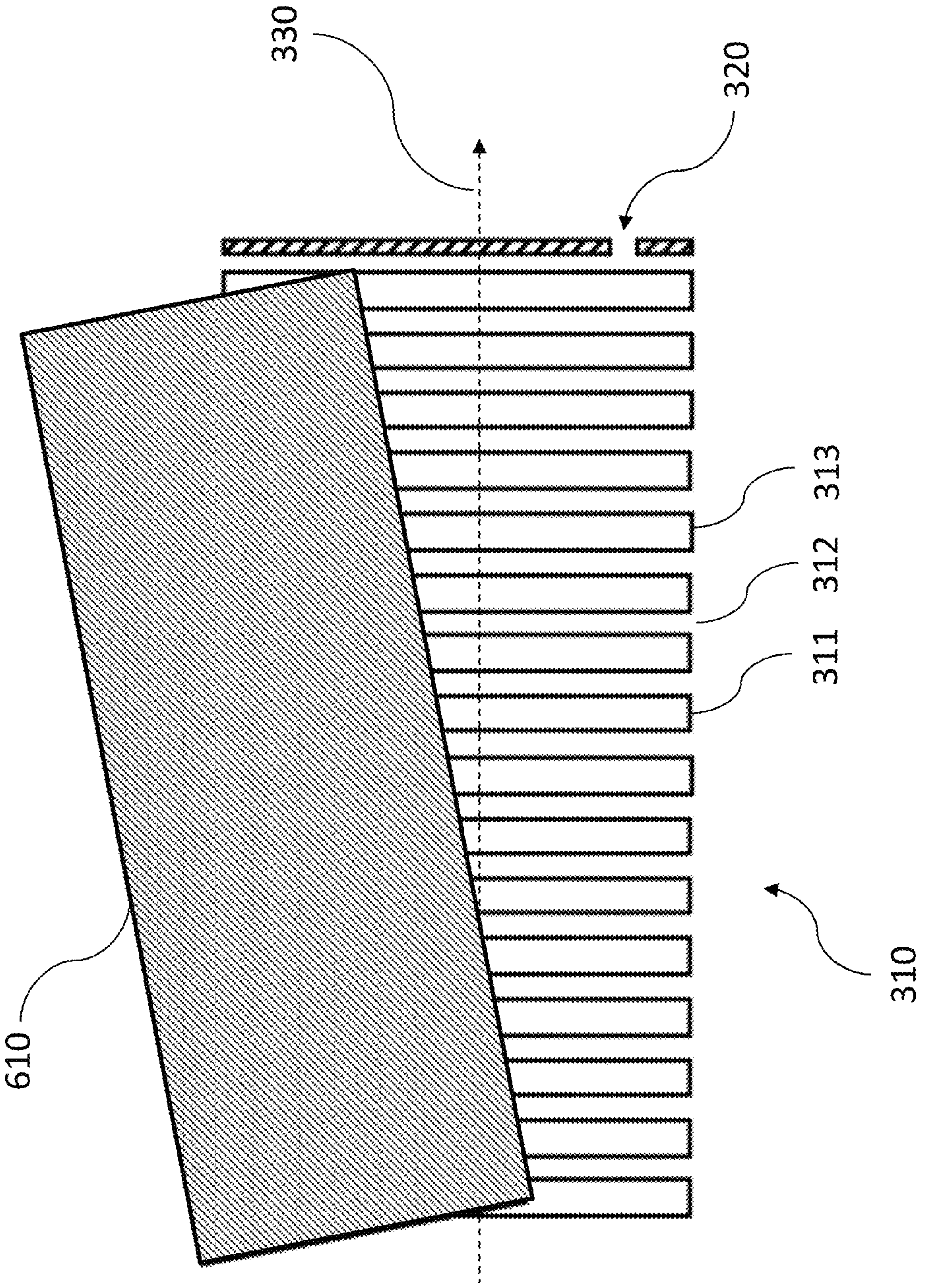
FIG. 6 shows a schematic drawing of an ion guide in accordance with an embodiment of the present disclosure, wherein the first electrode assembly comprises stacked ring electrodes and the second electrode assembly comprises a curved electrode tilted with respect to the central axis.

The second assembly comprising a single electrode is optionally not parallel to the central axis of the first electrode assembly. A surface of the single electrode that is adjacent to or facing the first electrode assembly is optionally not parallel to the central axis. For example, as shown in FIG. 6 an electrode 610 may be at an angle relative to the central axis. Otherwise, an electrode may comprise a conical bore (or partial conical bore). In use, a constant DC voltage applied to the second electrode may generate an axial DC gradient within the ion channel.

Figure 7:
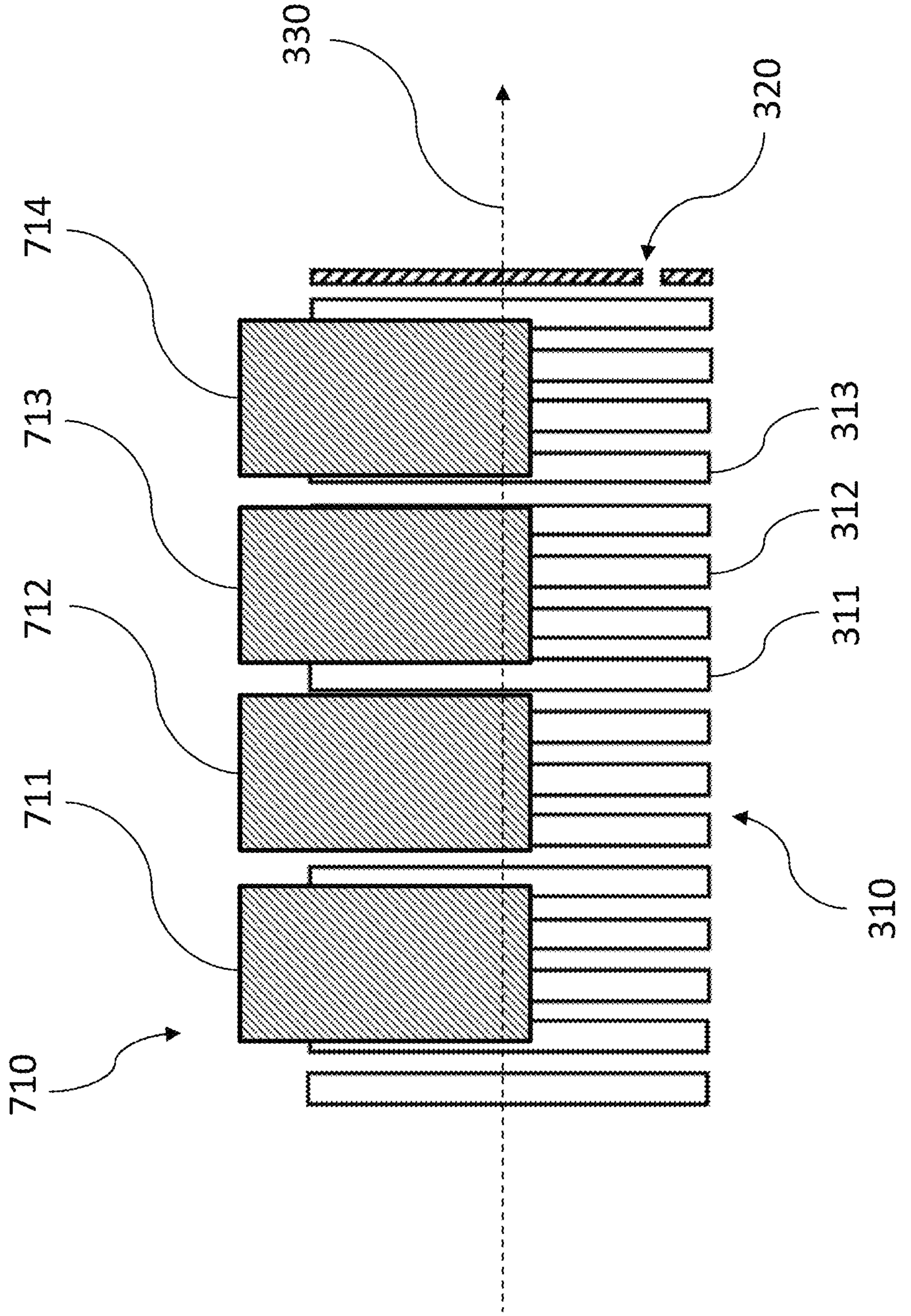
FIG. 7 shows a schematic drawing of a side view of an ion guide in accordance with an embodiment of the present disclosure, wherein the first electrode assembly comprises stacked ring electrodes and the second electrode assembly comprises segmented curved electrodes.

With reference to FIG. 7, the second electrode assembly 710 may comprise segmented electrodes. The example second electrode assembly 710 shown in FIG. 7 comprises four segmented electrodes 711, 712, 713 and 714, but the second electrode assembly may comprise more or fewer segmented electrodes. The segmented electrodes may have a first dimension in a direction parallel to the central axis that is larger than, equal to or smaller than a dimension of a guide electrode in a direction parallel to the central axis. The segmented electrodes may have a first dimension in a direction parallel to the central axis that is larger than, equal to or smaller than a spacing between the guide electrodes in a direction parallel to the central axis. The example illustrated in FIG. 7 shows segmented electrodes each with a first dimension that is larger than the dimension of each guide electrode in a direction parallel to the central axis. The segmented electrodes may comprise any shape described for the single electrode above. For example, the segmented electrodes may comprise partial cylindrical shells (similar to those shown in FIG. 1), sheets or rods. In use, different DC voltages may be applied to each segmented electrode, generating an axial DC gradient.

A distance from the segmented electrodes to the central axis may be constant or may be varied. In embodiments wherein the segmented electrodes comprise partial cylindrical shells, the radius of each segmented electrode may be constant or may be varied. The arc (or angle subtended to the centre of curvature) may be constant or may be varied.

The embodiments described above comprise circular guide electrodes. The confinement volume may comprise a cylindrical volume centred around the central axis. In use, the DC voltage received by the second electrode assembly deflects the ion beam to be centred off the central axis. The deflected ion beam may remain within the confinement volume. The DC voltage may be attractive (deflecting the ion beam towards the second electrode assembly) or repulsive (deflecting the ion beam away from the second electrode assembly). For example, in embodiments where the second electrode assembly comprises one or more electrodes comprising partial cylindrical shells, the ion beam will either be attracted towards an inner surface of the first electrode assembly adjacent to the apex of the second electrode assembly (for an attractive DC voltage), or repelled towards an inner surface of the first electrode assembly furthest from the apex of the second electrode assembly (for a repulsive DC voltage).

In addition to being deflected, the ion beam may be radially focused by the DC field. The degree to which the ion beam is radially focused may depend both on the electrode shape for the second electrode assembly and on the polarity of the DC field. For example, a second electrode assembly comprising partial cylindrical shell electrode(s) may, in use, more tightly focus the ion beam when a repulsive DC voltage is applied to the second electrode assembly than when an attractive DC voltage is applied to the second electrode assembly. In another example, a second electrode assembly comprising a rod electrode may, in use, more tightly focus the ion beam when an attractive DC voltage is applied to the second electrode assembly than when a repulsive DC voltage is applied to the second electrode assembly.

Figure 8:
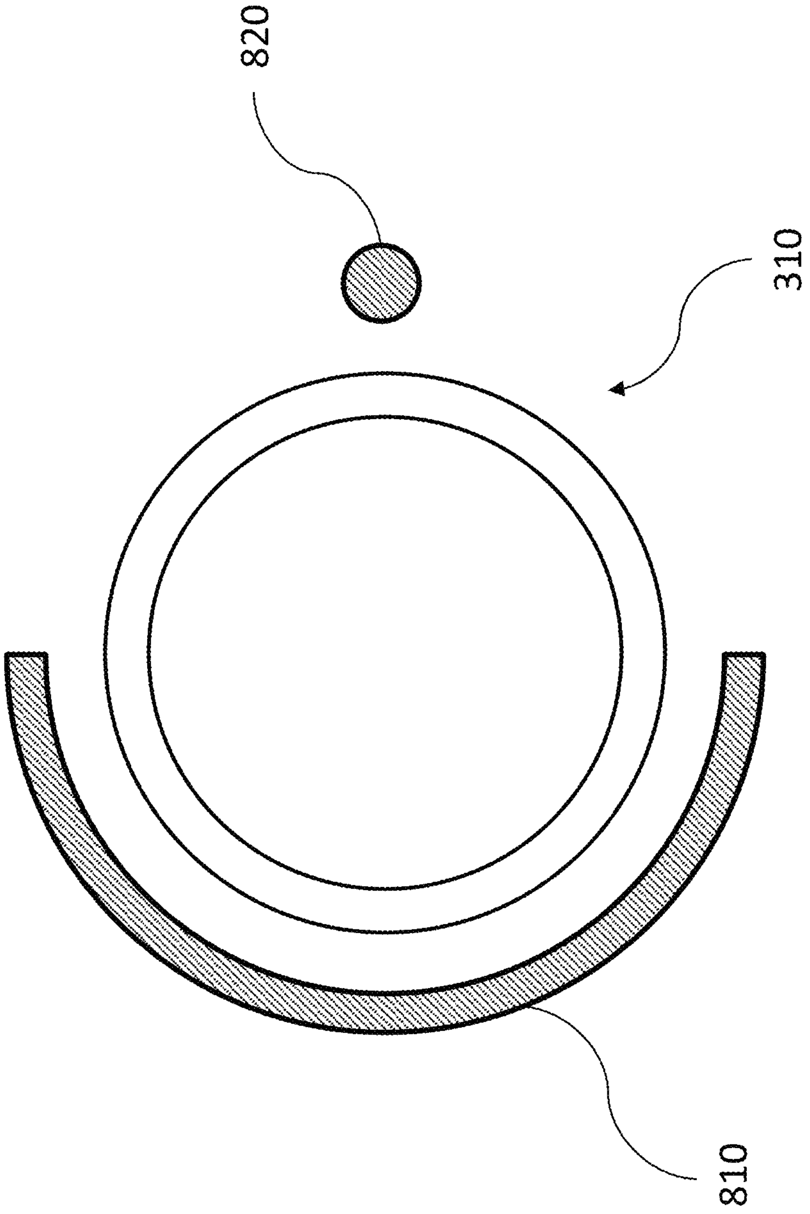
FIG. 8 shows a schematic drawing of a cross-section perpendicular to the central axis of an ion guide in accordance with an embodiment of the present disclosure, wherein the first electrode assembly comprises stacked ring electrodes and the second electrode assembly comprises a curved electrode and a rod electrode.

In embodiments, the second electrode assembly may comprise an electrode or electrodes configured to receive an attractive DC voltage adjacent to a first side of the first electrode assembly, and an electrode or electrodes configured to receive a repulsive DC voltage adjacent to a second side of the first electrode assembly opposite to the first side. These electrodes may be any shape. For example, with reference to FIG. 8, the second electrode assembly may comprise a partial cylindrical shell electrode 810 (similar to that described with reference to FIG. 3), and a rod electrode 820 (similar to that described with reference to FIG. 5). The partial cylindrical shell electrode 810 may be configured to receive a repulsive DC voltage, and the rod electrode 820 may be configured to receive an attractive DC voltage. The partial cylindrical shell electrode 810 and the rod electrode 820 may each comprise a single electrode or segmented electrodes.

As discussed above, the DC field may be varied in a direction parallel to the central axis, resulting in an axial DC gradient that may assist in moving the ions along the ion channel. The axial DC gradient may accelerate the ion beam along the ion channel. The axial DC gradient may be generated by varying the penetration of the DC field through the gaps between the guide electrodes. In the embodiments described above, this may be achieved by certain properties of the second electrode assembly. For example, the distance of the second electrode assembly from the central axis may be varied, or an arc of the second electrode assembly may be varied.

In other embodiments, an axial DC gradient may be achieved by varying the spacing between the guide electrodes. A larger spacing between guide electrodes allows greater penetration of the DC field into the ion channel and the confinement volume. In embodiments where the second electrode assembly is configured to receive a repulsive DC voltage, decreasing the spacing of the guide electrodes along the central axis (in the direction of travel of the ion beam) reduces the penetration of the DC field through the gaps between the guide electrodes. The resulting axial DC gradient accelerates or pulls the ions through the ion channel in a direction parallel to the central axis.

Figure 9:
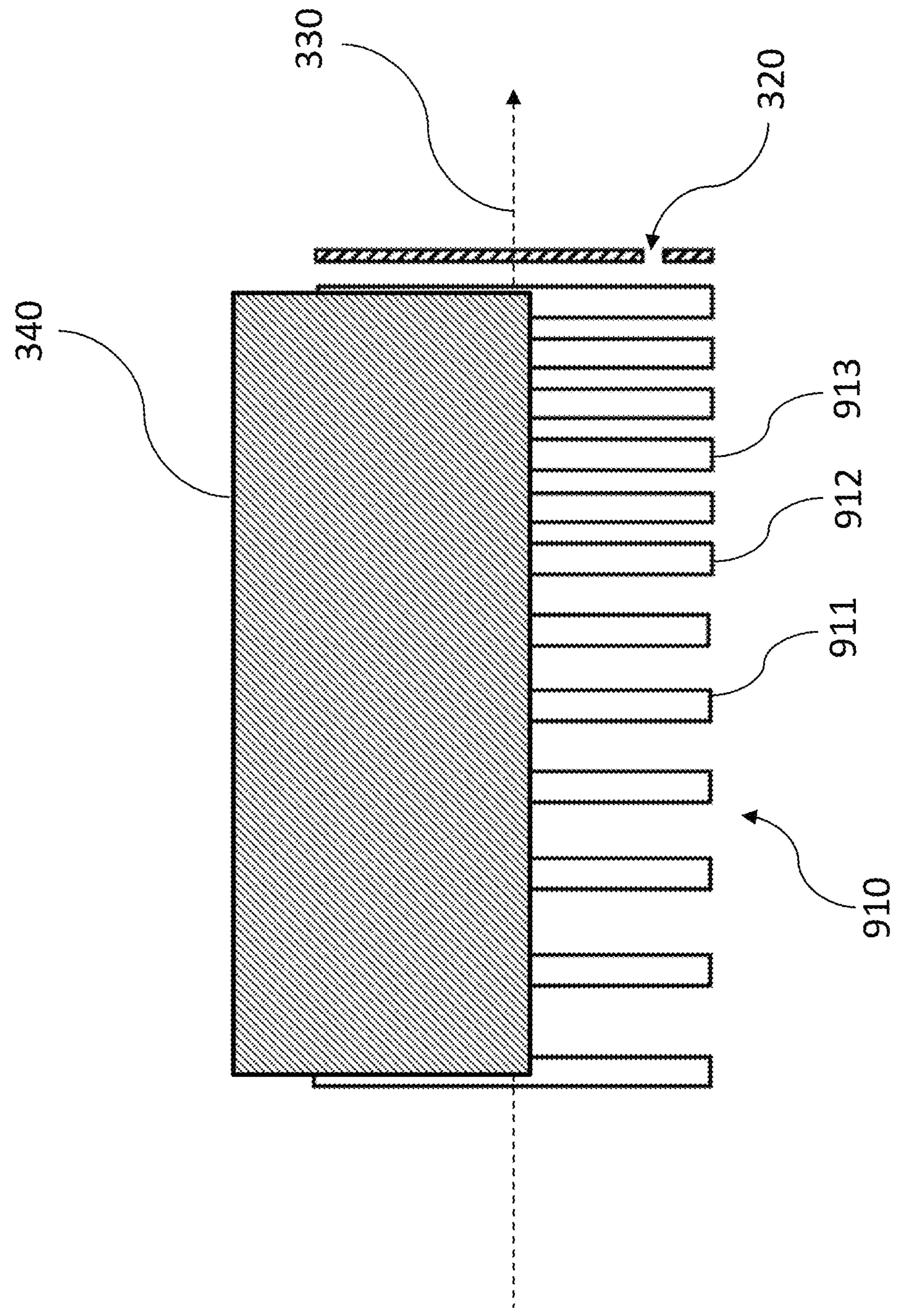
FIG. 9 shows a schematic drawing of a side view of an ion guide in accordance with an embodiment of the present disclosure, wherein the first electrode assembly comprises stacked ring electrodes with decreasing spacing and the second electrode assembly comprises a curved electrode.

An example is shown in FIG. 9. A side view of an ion guide is shown, comprising a second electrode assembly 340 similar to that shown in FIG. 3. The ion exit aperture 320 and central axis 330 are also shown. The first electrode assembly 910 comprises guide electrodes with decreasing spacing along the central axis (three guide electrodes 911, 912 and 913 are labelled as examples).

Figure 10:
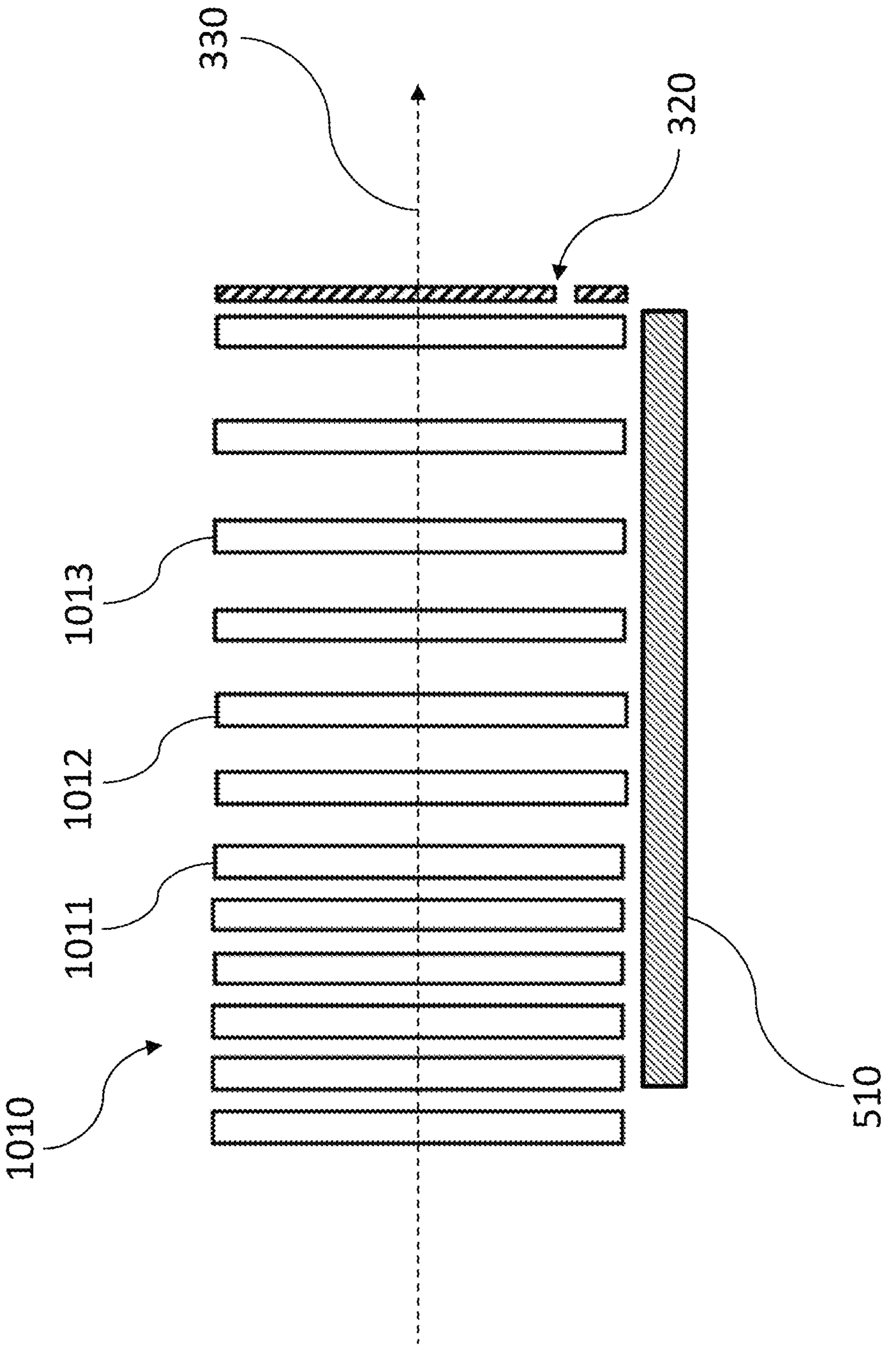
FIG. 10 shows a schematic drawing of a side view of an ion guide in accordance with an embodiment of the present disclosure, wherein the first electrode assembly comprises stacked ring electrodes with increasing spacing and the second electrode assembly comprises a rod electrode.

In embodiments where the second electrode assembly is configured to receive an attractive DC voltage, increasing the spacing of the guide electrodes along the central axis (in the direction of travel of the ion beam) increases the penetration of the DC field through the gaps between the guide electrodes. The resulting axial DC gradient accelerates or pulls the ions through the ion channel in a direction parallel to the central axis. An example is shown in FIG. 10. A side view of an ion guide is shown, comprising a second electrode assembly 510 similar to that shown in FIG. 5. The ion exit aperture 320 and central axis 330 are also shown. The first electrode assembly 1010 comprises guide electrodes with increasing spacing along the central axis (three guide electrodes 1011, 1012 and 1013 are labelled as examples).

In other embodiments, an axial DC gradient may be achieved by varying the thickness (in a direction parallel to the central axis) of the guide electrodes or the radius of the guide electrodes.

In the embodiments described above, the first electrode assembly comprises annular electrodes each comprising a circular aperture. This may result in a cylindrical confinement volume. Instead, the first electrode assembly may comprise annular electrodes comprising apertures of a different shape. The confinement volume may be a different shape, which may improve radial focusing of the ion beam. Examples are shown in FIGS. 11 and 12, but the apertures may be other shapes.

Figure 11A:
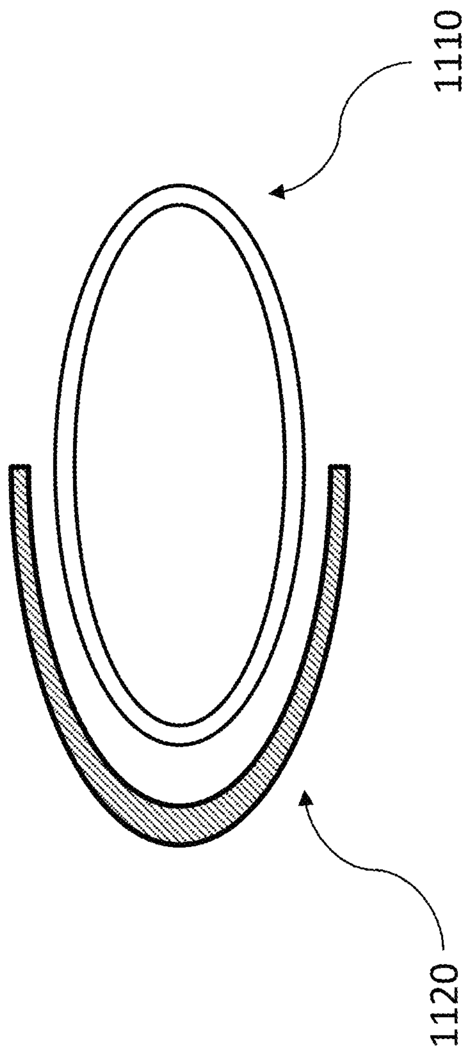
FIGS. 11A-11B show schematic drawings of a cross-section perpendicular to the central axis of an ion guide in accordance with an embodiment of the present disclosure.

For example, with reference to FIG. 11 (showing cross sections of the ion guide), the aperture of each guide electrode of the first electrode assembly may comprise a shape that narrows, such that in an event that the ion beam is deflected towards the narrower part of the ion guide the radial focusing of the ion beam is improved. These shapes of guide electrode may be combined with any second electrode assembly (including those described above). FIG. 11A shows an example wherein the aperture of each guide electrode of the first electrode assembly 1110 comprises an oval. The second electrode assembly 1120 may comprise an electrode or electrodes comprising a partial curved shell, with a cross-section having an oval shape. The positioning of the second electrode assembly is such that when the ion beam is deflected to be centred off the central axis, the ion beam is deflected towards the narrower part of the oval guide electrode. The confinement volume may have a cross-section with an oval shape. When the ion beam is deflected to be centred off the central axis, the narrowing of the confinement volume away from the central axis may help to radially focus the ion beam.

Figure 11B:
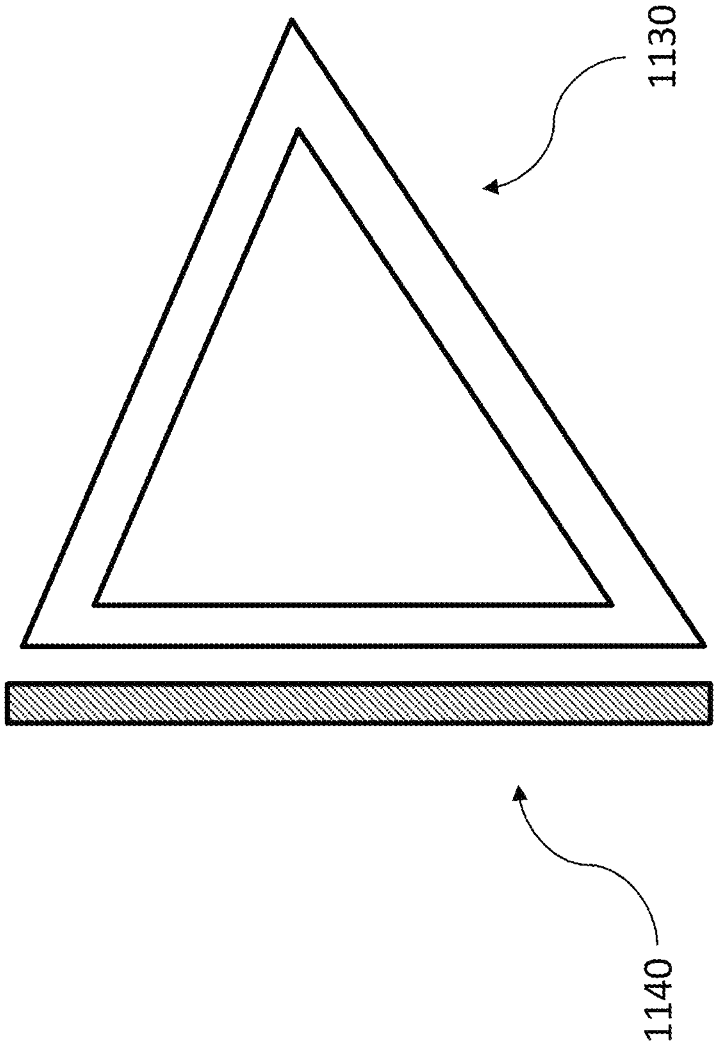
Figure 12:
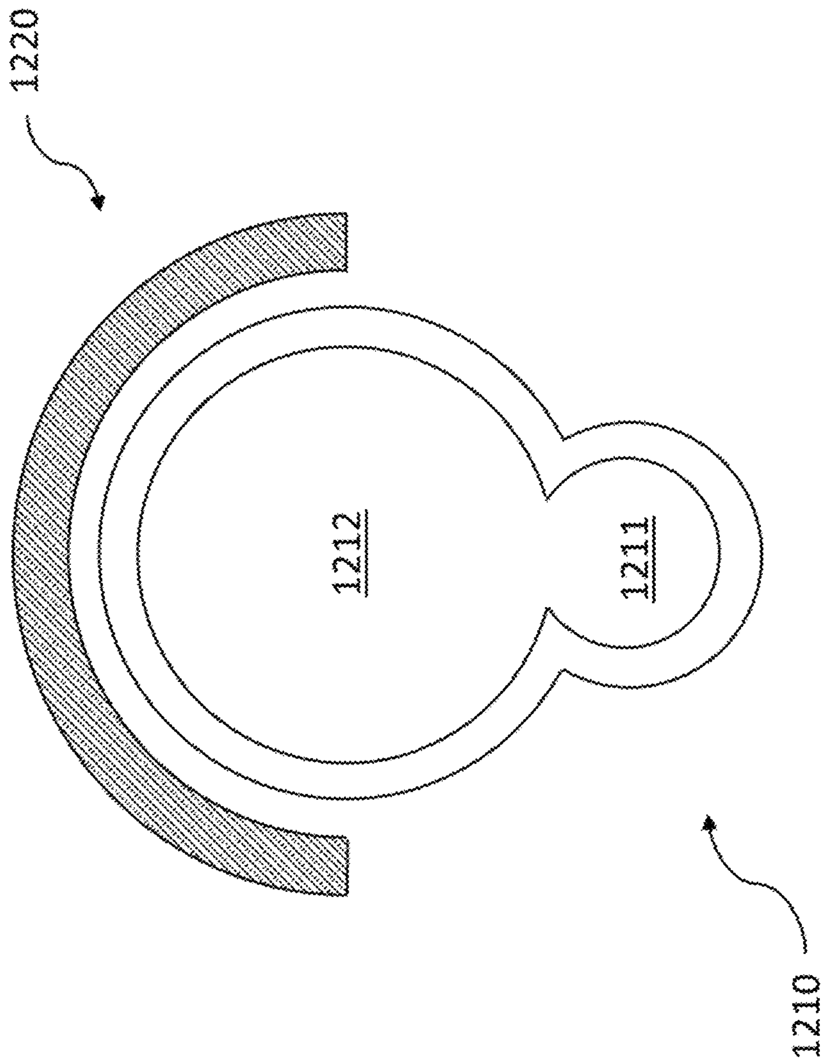
FIG. 12 shows a schematic drawing of a cross-section perpendicular to the central axis of an ion guide in accordance with an embodiment of the present disclosure, wherein the first electrode assembly comprises guide electrodes each with an aperture that is a combination of two overlapping circles, and the second electrode assembly comprises a curved electrode or electrodes.

Another example is shown in FIG. 11B (showing a cross-section of the ion guide). The first electrode assembly 1130 may comprise guide electrodes each comprising a triangular aperture. The ion channel may thus have a triangular cross-section. The second electrode assembly 1140 may comprise a flat sheet electrode or electrodes, arranged adjacent to a side of the triangular first electrode assembly 1130. The second electrode assembly 1140 may be configured to receive a repulsive DC voltage, such that, in use, the ion beam is deflected towards a point of the triangular ion channel opposite to the second electrode assembly 1140. As the confinement volume may have a triangular cross-section, when the ion beam is deflected to be centred off the central axis, the narrowing of the confinement volume away from the central axis may help to radially focus the ion beam. In other embodiments, the apertures may be squares or any other shapes. In general, the aperture of each guide electrode may comprise at least one vertex, and the ion beam may be deflected towards the vertex. In this way the radial focusing of the deflected ion beam may be improved.

The apertures of the guide electrodes may comprise shapes that are superpositions of multiple shapes. In other words, the aperture may comprise a first shape and a second shape, wherein the first shape overlaps with the second shape such that there is still a continuous aperture. For example, the apertures may comprise a larger shape superposed with a smaller shape such that the ion channel comprises a larger region and a smaller region. In an event that the ion beam is deflected into the smaller region, radial focusing of the ion beam may be improved. With reference to FIG. 12, the first electrode assembly 1210 may comprise guide electrodes each comprising a smaller circular aperture 1211 superimposed on a larger circular aperture 1212. The conjoined shapes provide a larger region bounded by a first arc, and a smaller region bounded by a second arc. The second electrode assembly 1220 may comprise a curved electrode or electrodes, arranged adjacent to a side of the first electrode assembly. The second electrode assembly 1220 may be configured to receive a repulsive DC voltage and may be arranged adjacent to a side of the first electrode assembly furthest from the smaller aperture. In use, the ion beam may be deflected into the smaller aperture. The smaller aperture may be the same or a similar size to an ion exit aperture. The smaller diameter of the second arc may allow the smaller region to be shielded from the DC field, such that a strong DC field may be used to deflect the ion beam into the smaller region, but once the ion beam is within the smaller region it may not be pushed too close to the guide electrodes, reducing risk of ion loss or fragmentation. The second arc of the smaller region may subtend an angle of greater than 180° to the centre of curvature, such that the entrance to the smaller region from the larger region is narrower than the diameter of the smaller region. The resulting overhang may increase shielding of the smaller region from the DC field.

The embodiments described so far comprise second electrode assemblies that are external to the first electrode assemblies. In other embodiments, the second electrode assembly may comprise electrodes mounted between the guide electrodes of the first electrode assembly. For example, the guide electrodes may comprise annular electrodes with a certain shape and radius. The second electrode assembly may comprise partial annular electrodes with the same shape and radius as the guide electrodes.

Figure 13A:
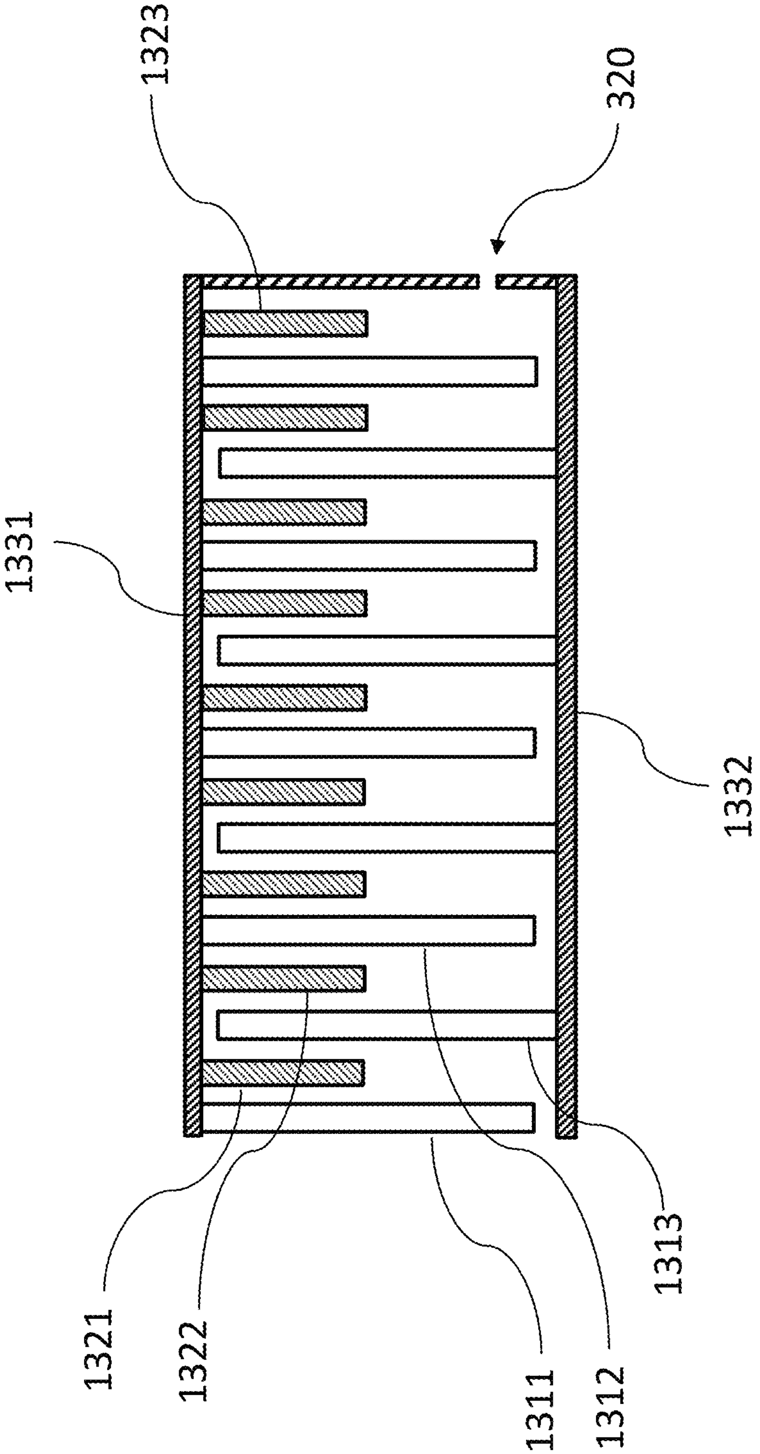
FIGS. 13A-13B show schematic drawings of an ion guide in accordance with an embodiment of the present disclosure, wherein the first electrode assembly comprises stacked ring electrodes and the second electrode assembly comprises segmented curved electrode mounted between the ring electrodes.
Figure 13B:
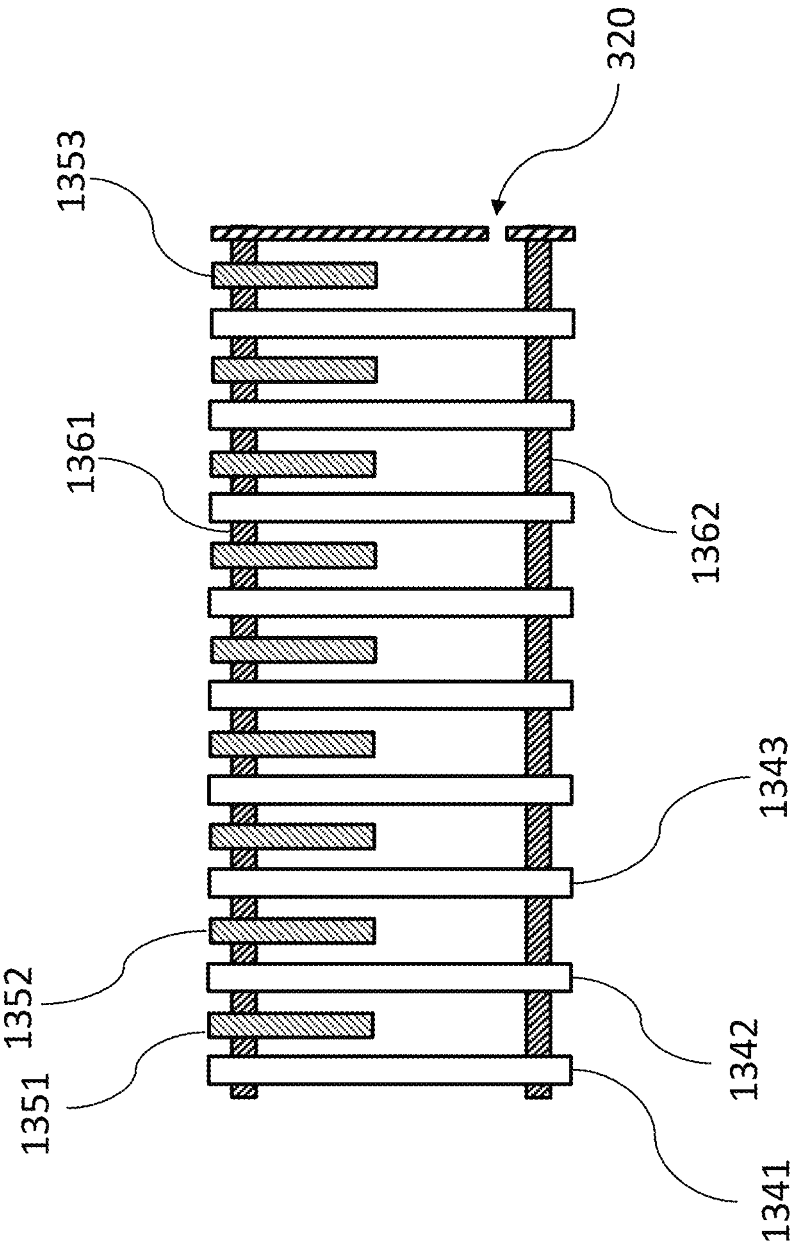

With reference to FIG. 13, examples are shown of ion guides where the second electrode assembly comprises electrodes mounted between the guide electrodes of the first electrode assembly. FIG. 13A shows the guide electrodes (white vertical rectangles, with three labelled as 1311, 1312 and 1313 as examples) mounted on a substrate (horizontal rectangles with hatching, 1331 and 1332). The second electrode assembly comprises electrodes (vertical rectangles with hatching, with three labelled as 1321, 1322 and 1323 as examples) mounted on the substrate between guide electrodes. The substrate may comprise a PCB substrate. The substrates 1331 and 1332 may comprise one continuous substrate (that is, 1331 and 1332 may be the same substrate) or separate substrates. As with previous figures, the ion exit aperture 320 is shown. FIG. 13B shows the guide electrodes (white vertical rectangles, with three labelled as 1341, 1342 and 1343 as examples) mounted on rods and/or spacers (horizontal rectangles with hatching, 1361 and 1362). The second electrode assembly comprises electrodes (vertical rectangles with hatching, with three labelled as 1351, 1352 and 1353 as examples) mounted on the substrate between guide electrodes. As with previous figures, the ion exit aperture 320 is shown.

Figure 14A:
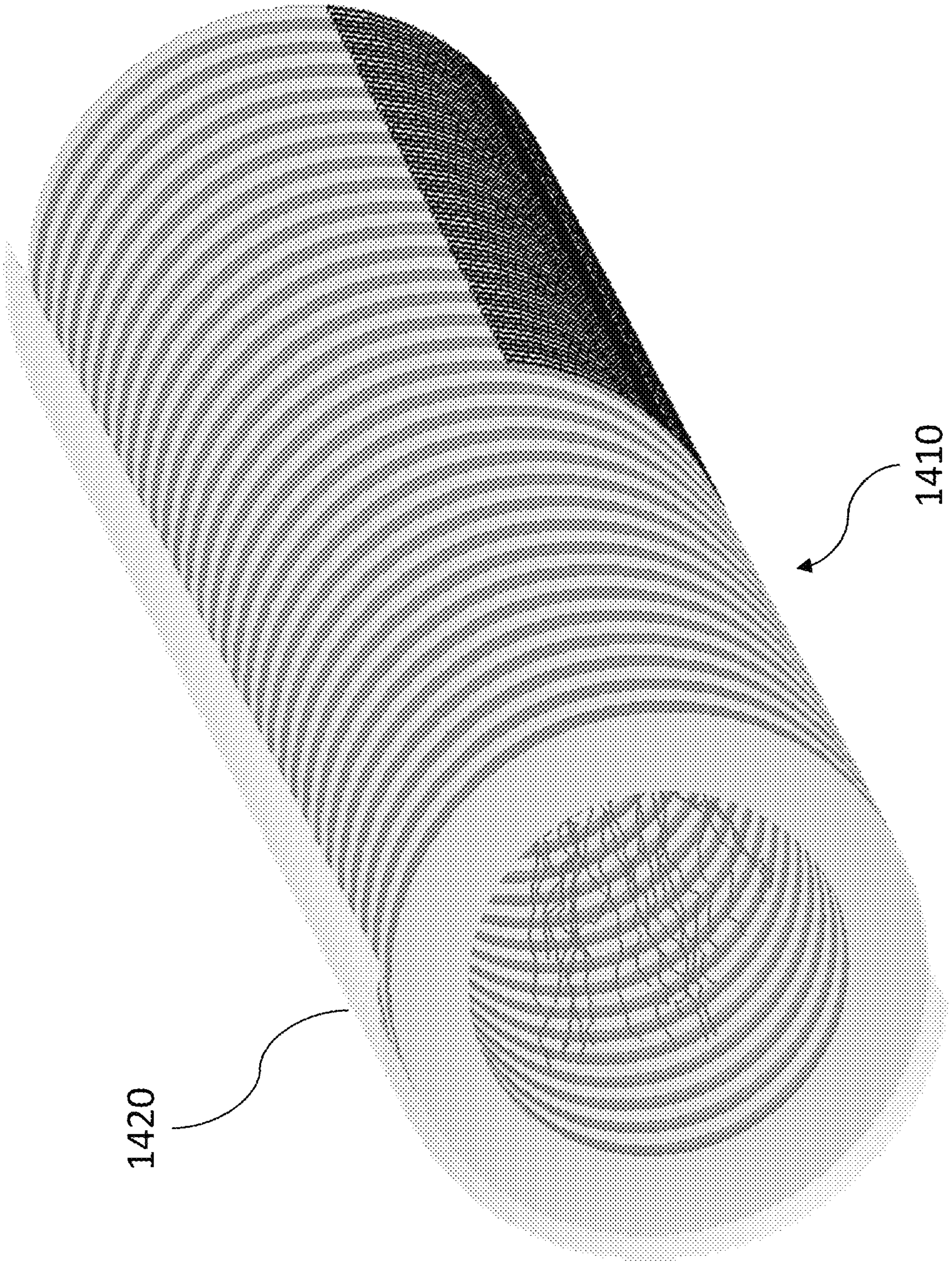
FIGS. 14A-14C show the results of a simulation of the trajectory of an ion beam through an ion guide in accordance with an embodiment of the present disclosure, wherein the first electrode assembly comprises stacked ring electrodes and the second electrode assembly comprises a curved electrode.
Figure 14B:
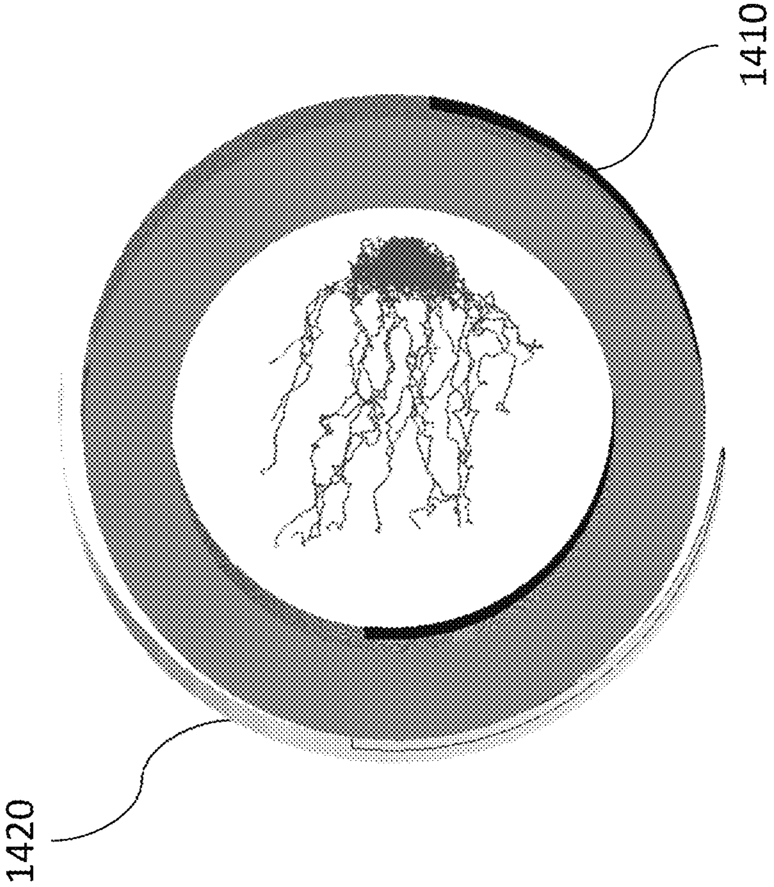
Figure 14C:
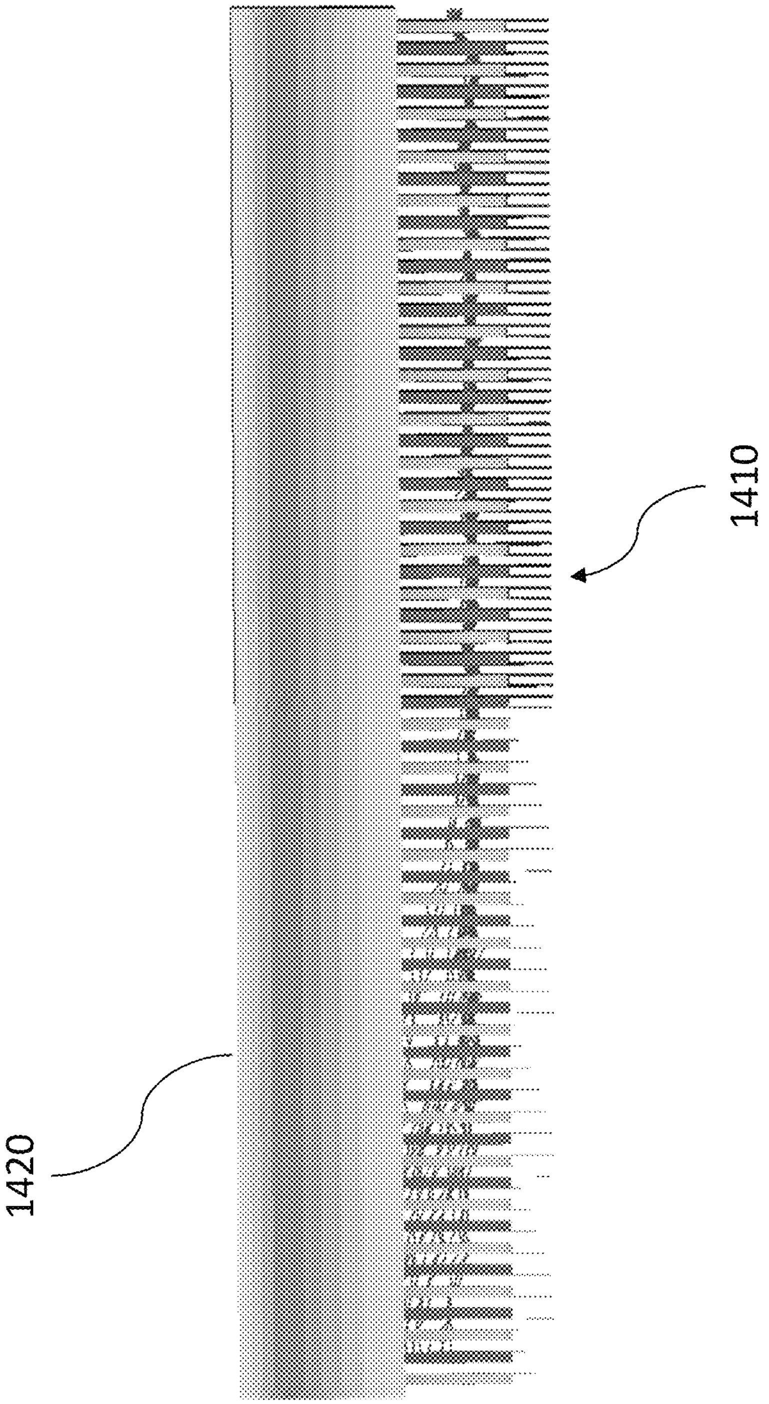
Figure 15:
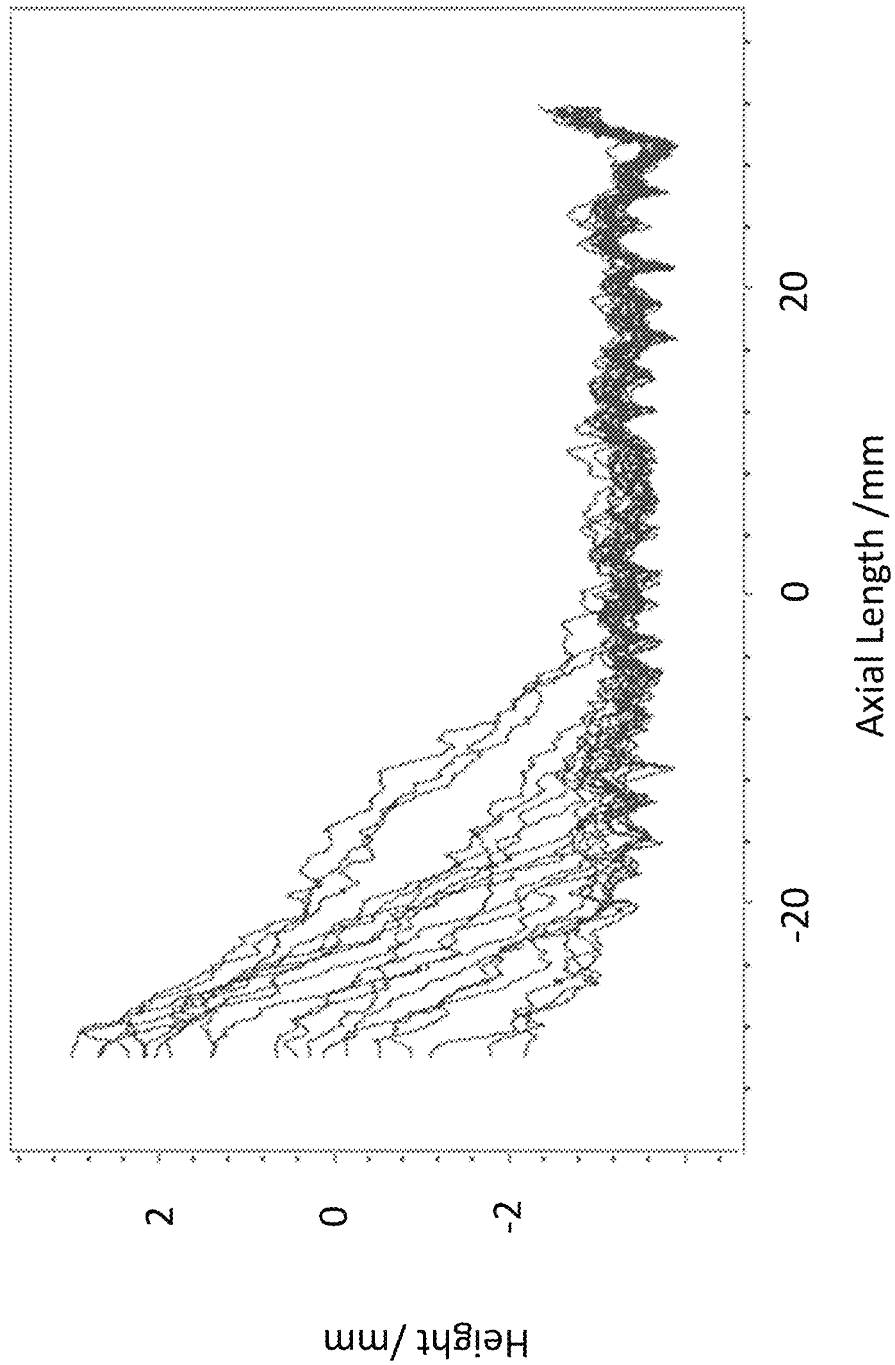
FIG. 15 shows a graph of the results of a simulation of the trajectory of an ion beam through an ion guide in accordance with an embodiment of the present disclosure, wherein the first electrode assembly comprises stacked ring electrodes and the second electrode assembly comprises a curved electrode. Height in the ion channel is on the y axis, and axial length of the ion guide is on the x axis.

FIGS. 14 and 15 show ion results of simulations of ion trajectories along an ion guide according to an embodiment of the present disclosure. For this simulation, the first electrode assembly comprises annular guide electrodes each with a circular aperture, and the second electrode assembly comprises a half cylindrical shell electrode. The simulation uses 63 guide electrodes, with a spacing of 0.5 mm between each guide electrode. Each guide electrode has a thickness of 0.5 mm, an inscribed radius (or inner radius) of 5 mm and an outer radius of 7 mm. The second electrode assembly comprises a half cylindrical shell electrode with a 7.5 mm inscribed radius, positioned 0.5 mm from the outer surfaces of the guide electrodes. A voltage of +10V was applied to the second electrode assembly and 200V 2 MHz RF was applied in alternating phases to alternating guide electrodes. The pressure was set to 1 mbar of nitrogen, and an arbitrary gas wind of 0.2 mm/μs was set to propel ions along the channel, in lieu of an applied axial DC gradient. An ion beam of m/z 500 ions was generated with a wide spatial spread and 5 eV kinetic energy at the entrance to the ion guide, and their trajectories tracked as they moved down the length of the device. Images of the simulation are shown, with trajectories, in FIG. 14. FIG. 14A shows a perspective view, FIG. 14B shows a cross-section perpendicular to the central axis, and FIG. 14C shows a side view. The first electrode assembly is labelled as 1410 and the second electrode assembly is labelled as 1420. FIG. 15 shows a plot of ion trajectories with height in the ion channel (with 0 being the central axis) and axial position (that is, distance travelled along the ion channel). It can be seen that in this example that the ions are quickly radially focused by the auxiliary DC to a narrow packet halfway through the guide, and suspended about 2 mm from the electrode surface whilst being drawn down the channel.

The second electrode assembly is positioned with respect to the first electrode assembly and is configured to receive a DC voltage, such that a centre of the ion beam is deflected to be off the central axis. In embodiments, part of the deflected ion beam may overlap with the central axis. In other embodiments, none of the deflected ion beam may overlap with the central axis.

Figure 16:
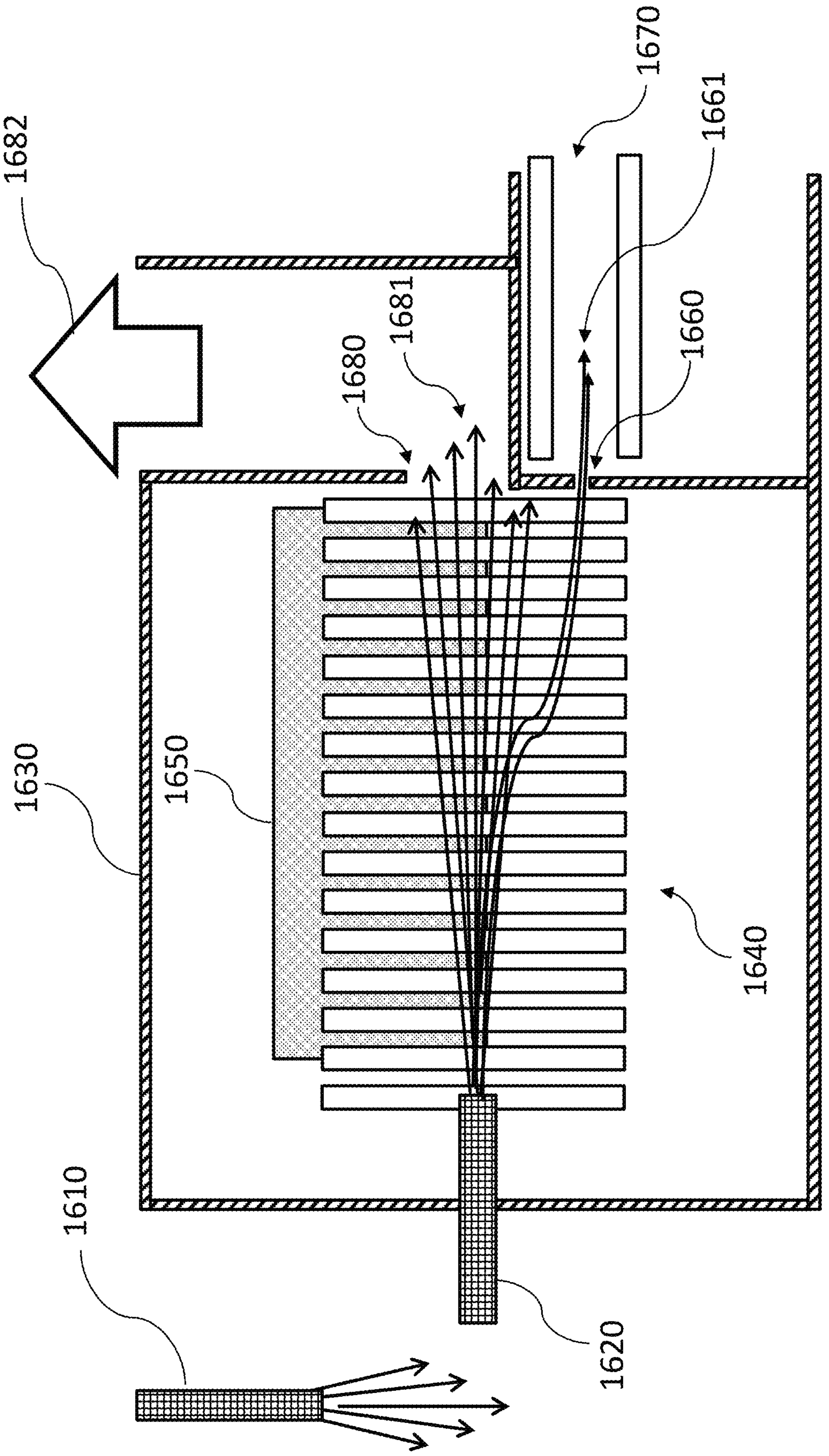
FIG. 16 shows an ion guide in accordance with an embodiment of the present disclosure, integrated into a vacuum interface of an ion utilising instrument such as a mass spectrometer.

FIG. 16 shows an ion guide in accordance with an embodiment of the present disclosure, integrated into a vacuum interface of an ion utilising instrument such as a mass spectrometer. This is intended as an example only, and the ion guide may be integrated in other arrangements. An ion source 1610 may introduce ions into the vacuum interface. The ion source 1610 may, for example, comprise an electrospray ion source. An inlet capillary 1620 then introduces the ions to the vacuum chamber 1630. The ion source 1610 and the inlet capillary 1620 may be at any angle relative to one another. The ions passing into the vacuum chamber 1630 via the inlet capillary 1620 may be part of a jet comprising neutrals or droplets. The jet and ions pass from the inlet capillary 1620 into the ion channel of an ion guide in accordance with an embodiment of the present disclosure.

The ion guide comprises a first electrode assembly 1640 and a second electrode assembly 1650. The jet passes through the ion channel undeflected by either the RF pseudopotential or the DC field. The ion beam is confined within the confinement volume by the RF pseudopotential (wherein the confinement volume is centred around a central axis), and the ion beam is deflected to be centred off the central axis by the DC field. The ions exit the ion channel and the vacuum chamber via an ion exit aperture 1660. The ions enter a downstream ion guide 1670. The ions exiting the vacuum chamber are indicated by arrows 1661. The downstream ion guide may be in a region of lower pressure than the vacuum chamber 1630. For example, the vacuum chamber 1630 may be at 2 mbar and the downstream ion guide 1670 may be at 0.2 mbar. The jet of neutrals and droplets may exit the ion channel via a jet exit aperture 1680 (the jet exiting the vacuum chamber is indicated by arrows 1681) and be removed from the vacuum chamber via a pump (as indicated by arrow 1680).

The inlet capillary 1620 may be offset from the central axis. The ion beam may be deflected to be centred off the central axis on the other side of the central axis from the inlet capillary. In this way, the jet will continue on its trajectory on one side of the central axis, and the ion beam will be deflected to the other side of the central axis. In an event that the inlet capillary 1620 is offset from the central axis, the ion beam may be deflected by both the RF pseudopotential (such that the ion beam would be centred on the central axis in the absence of any DC field) and the DC field.

The spacing between guide electrodes may be between 0.2 and 2.5 mm, or more preferably between 0.25 mm and 1 mm. The thickness of the guide electrodes (in a direction parallel to the central axis) may be between 0.2 and 2.5 mm, or more preferably between 0.25 mm and 1 mm. The aperture radius for each guide electrode may be between 5 and 50 mm, or more preferably between 5 and 20 mm. The deflection distance of the ion beam perpendicular to the central axis may be between 2 and 28 mm, or more preferably between 3 and 1 mm. The length of the ion guide may be between 10 and 200 mm, or more preferably between 20 and 100 mm. The penetration distance of the RF field into the ion channel is dependent on the spacing between the guide electrodes. Ions may be prevented from approaching the inner surfaces of the guide electrodes by less than 0.5 to 2.5 mm. These are examples only, and any of these parameters may have other values.

Figure 17:
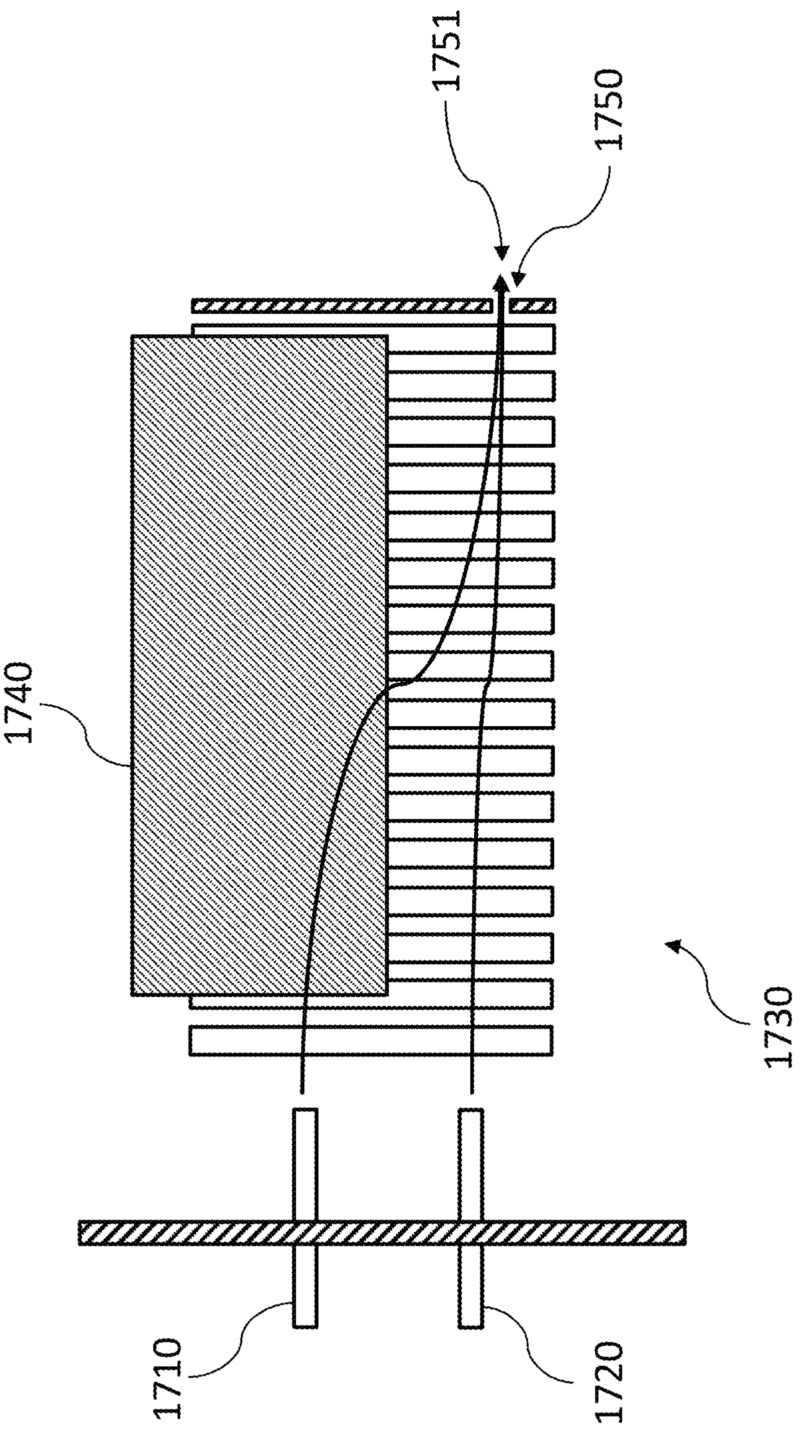
FIG. 17 shows an ion guide in accordance with an embodiment of the present disclosure, configured to receive a first ion beam and a second ion beam.

With reference to FIG. 17, in embodiments the ion channel may be configured to receive a first ion beam and a second ion beam. The ion channel may be configured to receive the first ion beam via a first inlet capillary 1710 and to receive the second ion beam via a second inlet capillary 1720. The first inlet capillary 1710 may receive ions from a first ion source, and the second inlet capillary 1720 may receive ions from a second ion source. For example, the first ion source may comprise a sample ion source and the second ion source may comprise a calibrant ion source. The ion channel may be configured to receive ions from one of the first and second inlet capillaries 1710, 1720 at a given time, or may be configured to receive ions from both of the first and second inlet capillaries 1710, 1720 at a given time. The ion beams received by the first and second inlet capillaries 1710, 1720 may both exit the ion guide via ion exit aperture 1750 (the ions are labelled as 1751 after the ion exit aperture 1750). As in FIG. 16, any neutrals or droplets entering the ion channel via the first and second inlet capillaries 1710, 1720 may exit the ion guide via a jet exit aperture that is separate to the ion exit aperture 1750 (the jet of neutrals and droplets and the jet exit aperture(s) are not shown in FIG. 17). In embodiments, the beams received by the first and second inlet capillaries 1710, 1720 may both exit the ion guide via the same ion exit aperture. In other embodiments, the beams received by the first and second inlet capillaries 1710, 1720 may exit the ion guide via different ion exit aperture. In an example where the beams exit the ion guide via different ion exit apertures, the first and second inlet capillaries may be separated across the width of the ion guide. The DC gradient may comprise a triangular profile such that the two ion beams are kept separate. Otherwise, the second electrode assembly may comprise two attractive DC electrode assemblies for deflecting each ion beam, or the first electrode assembly may be shaped to create two defined ion channels with a barrier between them (for example by using guide electrodes with apertures comprising conjoined circles). The beams may be merged downstream of the ion guide, or directed to different mass analysers (of multiple mass analysers or an arrayed mass analyser). FIG. 17 shows a first electrode assembly 1730 comprising stacked electrodes with constant thickness and spacing, and a repulsive second electrode assembly 1740. An ion guide comprising any of the first and second electrode assemblies described earlier may be configured to receive a first ion beam and a second ion beam.

Figure 18:
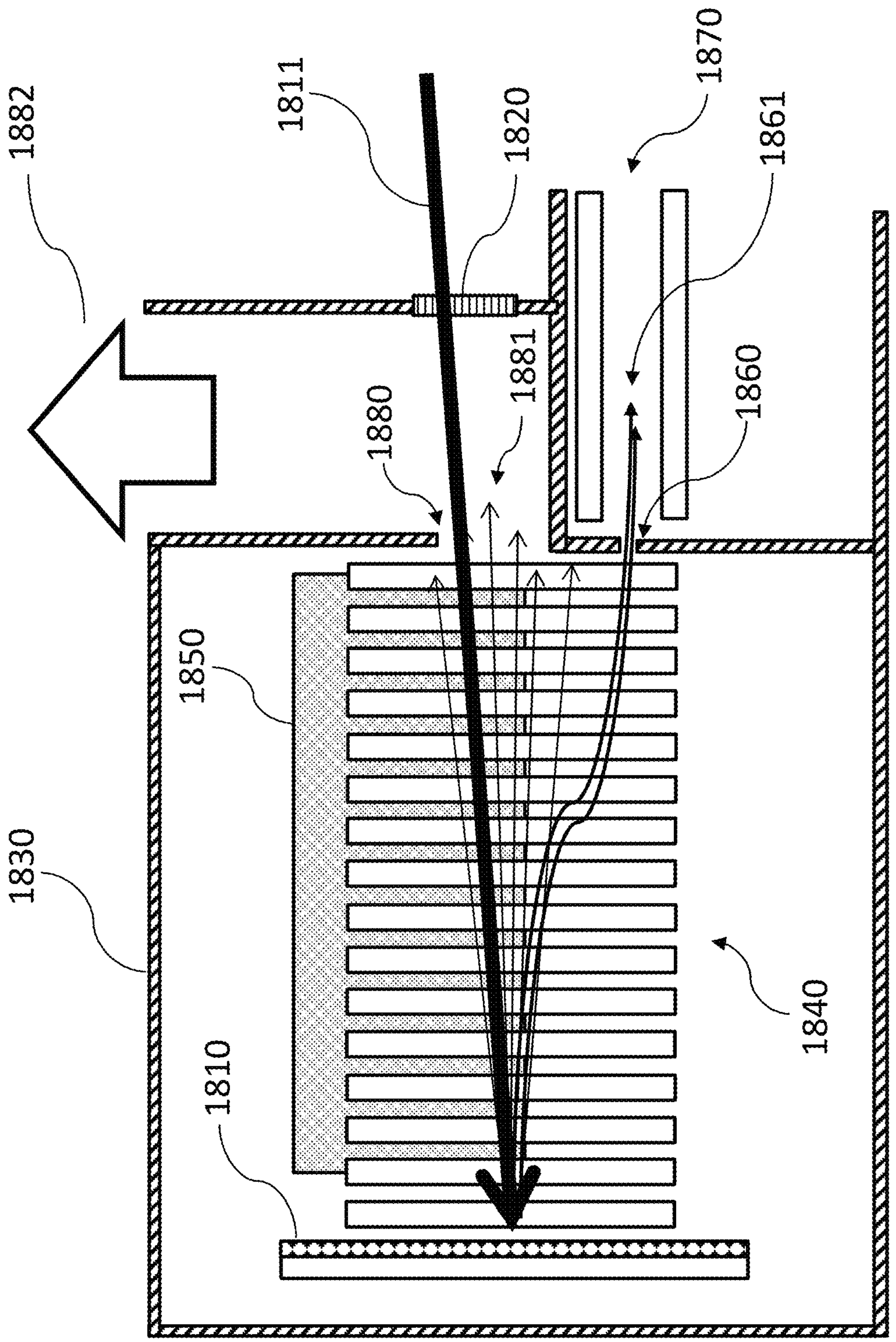
FIG. 18 shows an ion guide in accordance with an embodiment of the present disclosure, integrated into a vacuum interface of an ion utilising instrument such as a mass spectrometer, wherein the ion guide is configured to receive ions from an ion source comprising a sample plate configured to be irradiated by a laser.

FIG. 18 shows an ion guide in accordance with an embodiment of the present disclosure, integrated into a vacuum interface of an ion utilising instrument such as a mass spectrometer. This is intended as an example only, and the ion guide may be integrated in other arrangements. Referring back to FIG. 16, the ion channel is configured to receive the ion beam at the first end of the first electrode assembly 1640 via an inlet capillary 1620, wherein the inlet capillary 1620 is positioned at or adjacent to the first end of the first electrode assembly 1640. The inlet capillary 1620 receives the ion beam from an ion source 1610, that may be located outside the vacuum chamber 1630 (such that the inlet capillary 1620 passes the ion beam into the vacuum chamber 1630 from the ion source 1610). By contrast, in the embodiment shown in FIG. 18, the ion channel may be configured to receive the ion beam at the first end of the first electrode assembly 1840 directly from an ion source 1810. The ion source 1810 and the ion guide may be located within a vacuum chamber 1830. The ion source 1810 may comprise a sample plate configured to release ions. The sample plate may be configured to release ions on irradiation by a laser beam 1811. The laser beam 1811 may enter the vacuum chamber 1830 via a window 1820, and may pass through the ion guide to irradiate the sample plate 1810. In the example shown in FIG. 18, the laser beam enters the ion guide via the second end of the first electrode assembly. Due to the constant radii of the guide electrodes (as opposed to decreasing radii of an ion funnel), the laser beam may enter the ion guide via the second end at a narrow or zero angle. Irradiating the sample plate at a shallow angle may improve sensitivity. The laser may strike the sample plate with an angle of incidence (with respect to the normal of the sample plate) of less than 10°, or preferably less than 5°, or more preferably less than 3°, or more preferably less than 1°. In embodiments, the point of irradiation of the sample plate by the laser may be moved, replacing the need for a moving sample stage. In other embodiments, the laser may enter the ion guide via a gap or aperture in the first electrode assembly. The sample plate 1810 may comprise a matrix-assisted laser desorption/ionization (MALDI) plate. The sample plate 1810 may comprise a sample mixed with a matrix material, wherein the mixture is applied to a metal plate. Irradiation of the sample plate by a laser beam (such as a pulsed laser beam) may trigger ablation and desorption of the sample and matrix material. The sample molecules (analyte molecules) may be ionized by being protonated or deprotonated in a hot plume of ablated gases. The ion beam and the ablated gases may enter the ion channel of an ion guide in accordance with an embodiment of the present disclosure. As in the embodiments described above, the ablated gases may comprise neutrals and droplets. The ion beam may be urged along the ion guide by the ablated gases or by an axial DC gradient.

The ion guide comprises a first electrode assembly 1840 and a second electrode assembly 1850. The ablated gases pass through the ion channel undeflected by either the RF pseudopotential or the DC field. The ion beam is confined within the confinement volume by the RF pseudopotential (wherein the confinement volume is centred around a central axis), and the ion beam is deflected to be centred off the central axis by the DC field. The ions exit the ion channel and the vacuum chamber via an ion exit aperture 1860. The ions enter a downstream ion guide 1870. The ions exiting the vacuum chamber are indicated by arrows 1861. In this way, the ions may be separated from the plume of gases without coming into contact with electrodes. The downstream ion guide may be in a region of lower pressure than the vacuum chamber 1830. For example, the vacuum chamber 1830 may be at 2 mbar and the downstream ion guide 1870 may be at 0.2 mbar. The ablated gases may exit the ion channel via a gas exit aperture 1880 (the ablated gases exiting the vacuum chamber are indicated by arrows 1881) and be removed from the vacuum chamber via a pump (as indicated by arrow 1880).

The point of irradiation of the sample plate 1810 by the laser 1820 may be offset from the central axis. The ion beam may be deflected to be centred off the central axis on the other side of the central axis from the inlet capillary. In this way, the ablated gases will continue on its trajectory on one side of the central axis, and the ion beam will be deflected to the other side of the central axis. In an event that the point of irradiation is offset from the central axis, the ion beam may be deflected by both the RF pseudopotential (such that the ion beam would be centred on the central axis in the absence of any DC field) and the DC field.

Although embodiments according to the disclosure have been described with reference to particular types of devices and applications (particularly mass spectrometers) and the embodiments have particular advantages in such case, as discussed herein, approaches according to the disclosure may be applied to other types of device and/or applications. The specific manufacturing details of the ion guide and associated uses, whilst potentially advantageous (especially in view of known manufacturing constraints and capabilities), may be varied significantly to arrive at devices with similar or identical operation. Each feature disclosed in this specification, unless stated otherwise, may be replaced by alternative features serving the same, equivalent or similar purpose. Thus, unless stated otherwise, each feature disclosed is one example only of a generic series of equivalent or similar features.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as an analogue to digital convertor) means "one or more" (for instance, one or more analogue to digital convertor). Throughout the description and claims of this disclosure, the words "comprise", "including", "having" and "contain" and variations of the words, for example "comprising" and "comprises" or similar, mean "including but not limited to", and are not intended to (and do not) exclude other components.

The use of any and all examples, or exemplary language ("for instance", "such as", "for example" and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the aspects and/or features disclosed in this specification may be combined in any combination, except combinations where at least some of such features and/or steps are mutually exclusive. As described herein, there may be particular combinations of aspects that are of further benefit, such the aspects of ion guides for use in mass spectrometers and/or ion mobility spectrometers. In particular, the preferred features of the invention are applicable to all aspects of the invention and may be used in any combination. Likewise, features described in non-essential combinations may be used separately (not in combination).

The invention claimed is:

1. An ion guide for a spectrometer, the ion guide comprising:
- a first electrode assembly comprising a plurality of guide electrodes aligned along a central axis, wherein:
  - each guide electrode comprises an aperture;
  - the central axis passes through the apertures such that the apertures define an ion channel from a first end of the first electrode assembly to a second end of the first electrode assembly;
  - the ion channel is configured to receive an ion beam at the first end; and
  - the guide electrodes are configured to receive RF voltages to define a confinement volume for the ion beam, wherein the confinement volume is centred about the central axis; and
- a second electrode assembly adjacent to the first electrode assembly, wherein the second electrode assembly is positioned with respect to the first electrode assembly to receive a DC voltage, such that a centre of the ion beam is deflected to be off the central axis, the deflected ion beam is contained within the confinement volume of the first electrode assembly, and the deflected ion beam is directed towards an ion exit aperture.

2. The ion guide of claim 1 wherein each guide electrode comprises an annular electrode.

3. The ion guide of claim 1, wherein the aperture of each guide electrode comprises any of:
- a circle;
- an oval; and
- at least one vertex.

4. The ion guide of claim 1, wherein the aperture of each guide electrode comprises a combination of a first shape and a second shape, wherein the first shape overlaps with the second shape.

5. The ion guide of claim 1, wherein the first electrode assembly comprises the plurality of guide electrodes at constant spacing.

6. The ion guide of claim 1, wherein the first electrode assembly comprises the plurality of guide electrodes with either:
- increasing spacing along the central axis; or
- decreasing spacing along the central axis.

7. The ion guide of claim 1, wherein the plurality of guide electrodes are configured to receive RF voltages of alternating polarity.

8. The ion guide of claim 1, wherein the second electrode assembly is configured to receive either:
- a repulsive DC voltage; or
- an attractive DC voltage.

9. The ion guide of claim 1, wherein the second electrode assembly comprises a curved sheet electrode.

10. The ion guide of claim 9 wherein the second electrode assembly comprises a partial cylindrical shell electrode.

11. The ion guide of claim 1, wherein the second electrode assembly comprises a rod electrode.

12. The ion guide of claim 1, wherein the second electrode assembly comprises a flat sheet electrode.

13. The ion guide of claim 1, wherein the second electrode assembly comprises a plurality of electrodes.

14. The ion guide of claim 1, wherein a distance from the central axis to the second electrode assembly varies along the central axis.

15. The ion guide of claim 1, wherein the second electrode assembly is positioned externally to the first electrode assembly.

16. The ion guide of claim 1, wherein the second electrode assembly comprises a plurality of auxiliary electrodes mounted between the plurality of guide electrodes.

17. The ion guide of claim 1, wherein the ion guide is configured to receive the ion beam offset from the central axis.

18. An inlet apparatus for a spectrometer comprising an ion guide as recited in claim 1.

19. The inlet apparatus of claim 18, wherein the ion exit aperture is configured to receive the deflected ion beam exiting the ion channel and to direct the ion beam towards an analyser of the spectrometer.

20. The inlet apparatus of claim 18, further comprising a jet exit aperture configured to receive undeflected neutral components of the ion beam exiting the ion channel.

21. The inlet apparatus claim 18, further comprising a first inlet capillary, wherein the ion channel is configured to receive the ion beam via the first inlet capillary.

22. The inlet apparatus of claim 21 further comprising a second inlet capillary, wherein the ion channel is configured to receive a first ion beam via the first inlet capillary and to receive a second ion beam via the second inlet capillary.

23. The inlet apparatus of claim 18, further comprising an ion source comprising a sample plate configured to release ions upon irradiation.

24. The inlet apparatus of claim 23 configured to receive a laser beam through the ion channel.

25. The inlet apparatus of claim 24, wherein the sample plate comprises a matrix-assisted laser desorption/ionization, MALDI, plate.

* * * * *